(12) United States Patent
Miyamoto et al.

(10) Patent No.: US 6,273,406 B1
(45) Date of Patent: Aug. 14, 2001

(54) LIQUID-ENCAPSULATED BUSHING

(75) Inventors: Yasuo Miyamoto; Isamu Doi; Hiroshi Tokimoto, all of Wako; Masaru Yamazaki, Yokohama, all of (JP)

(73) Assignees: Honda Giken Kogyo Kabushiki Kaisha, Tokyo; Hokushin Corporation, Kanagawa, both of (JP)

(*) Notice: Subject to any disclaimer, the term of this patent is extended or adjusted under 35 U.S.C. 154(b) by 0 days.

(21) Appl. No.: 09/089,400

(22) Filed: Jun. 3, 1998

(30) Foreign Application Priority Data

Jun. 4, 1997 (JP) .................................................. 9-146609
Jun. 4, 1997 (JP) .................................................. 9-146610

(51) Int. Cl.$^7$ .................................................. F16C 11/06
(52) U.S. Cl. .................................................. 267/140.12; 267/220
(58) Field of Search .................. 267/140.12, 140.11, 267/140.15, 214, 220

(56) References Cited

U.S. PATENT DOCUMENTS 4,893,799 * 1/1990 De Fontenay .................. 267/140.12
5,690,320 * 11/1997 Kanda .............................. 267/140.12
5,947,455 * 9/1999 Mikasa et al. ........................ 267/220

FOREIGN PATENT DOCUMENTS 1-275209    11/1989   (JP) .

* cited by examiner

Primary Examiner—Matthew C. Graham
(74) Attorney, Agent, or Firm—Arent Fox Kintner Plotkin & Kahn

(57) ABSTRACT

A first bushing rubber and a first collar are integrally fixed to an outer periphery of a left end of an inner tube which supports a spherical portion of a support shaft for rotation through a bearing. A second bushing rubber and a second collar are integrally fixed to an inner periphery of a right end of an outer tube which is disposed outside the inner tube. A liquid chamber, containing a liquid encapsulated therein, is defined between the first and second bushing rubbers by axially placing the outer tube over the outside of the inner tube, fixing the outer tube to the first collar by caulking, and fixing the second collar to the inner tube by press-fitting. Thus, it is possible to easily determine the spring characteristics of the first and second bushing rubbers and the sectional shape of the liquid chamber.

9 Claims, 27 Drawing Sheets

LIQUID-ENCAPSULATED BUSHING

BACKGROUND OF THE INVENTION

1. Field of the Invention

The present invention relates to a liquid encapsulated bushing used, for example, in a section for supporting a suspension arm of an automobile on a vehicle body.

2. Description of the Related Art

A liquid encapsulated bushing is known, for example, as described in Japanese Patent Application Laid-open No. 1-275209. In such a liquid encapsulated bushing, the dynamic spring constant can be reduced compared to the prior art bushing in which the absorption of a vibration is performed only by the elasticity of a bushing rubber. Hence, the load noise can be effectively decreased.

In the known liquid encapsulated bushing described in Japanese Patent Application Laid-open No. 1-275209, an inner tube and an outer tube are connected to each other by a single bushing rubber. For this reason, it is difficult not only to finely regulate axial and radial spring characteristics of the bushing rubber, but also to establish any sectional shape of a liquid chamber defined in the bushing rubber.

In addition, the known liquid encapsulated bushing described in Japanese Patent Application Laid-open No. 1-275209 includes a liquid chamber in an area where a cylindrical bushing rubber, which interconnects the inner and outer tubes, is in contact with the inner tube. For this reason, it is necessary not only to define an injecting bore, which extends through the outer tube and the bushing rubber, for injecting a liquid into the liquid chamber, but also to occlude the injecting bore after injection of the liquid. Thus, it is difficult to produce the liquid encapsulated bushing, and the cost is increased.

SUMMARY OF THE INVENTION

The present invention has been accomplished with the above circumstance in view. It is a first object of the present invention to provide a liquid encapsulated bushing, wherein the spring characteristics of the bushing rubber and the sectional shape of the liquid chamber can be easily determined.

It is a second object of the present invention to provide a liquid encapsulated bushing, wherein the encapsulation of the liquid into the liquid chamber can be easily carried out.

To achieve the above first object, according to a first aspect and feature of the present invention, there is provided a liquid encapsulated bushing comprising an inner tube supporting a spherical portion which is formed on a support shaft for rotation by an inner peripheral surface thereof. A first elastomeric member is fixed to an outer peripheral surface of the inner tube on an axially first end side. An outer tube is disposed to cover the outside of the inner tube. A second elastomeric member is fixed to the inner peripheral surface of the outer tube on the axially second end side. A liquid chamber, containing a liquid encapsulated therein, is defined between the first and second elastomeric members by axially inserting the inner tube into the outer tube, coupling the first elastomeric member to the inner peripheral surface of the outer tube on the axially first end side and coupling the second elastomeric member to the outer peripheral surface of the inner tube on the axially second end side.

With the above arrangement, the liquid chamber, containing the liquid encapsulated therein, is defined between the first elastomeric member and the second elastomeric member by axially coupling the assembly, which is integrally formed by the inner tube and the first elastomeric member, to the assembly integrally formed by the outer tube the second elastomeric member. The first and second elastomeric members can be produced separately. Hence, it is easy not only to finely regulate the axial and radial spring characteristics of the first and second elastomeric members, but also to establish any sectional shape for the liquid chamber.

To achieve the first object of the present invention, according to a second aspect and feature of the present invention, there is provided a liquid encapsulated bushing comprising an inner tube supporting a spherical portion which is formed on a support shaft for rotation by an inner peripheral surface thereof. A first elastomeric member is fixed to an outer peripheral surface of the inner tube on an axially first end side. An outer tube, whose inner peripheral surface on its axially first end side, is fixed to the first elastomeric member. A second elastomeric member is axially inserted into the outer tube and is fixed to the outer peripheral surface of the inner tube on its axially second end side and is fixed to the inner peripheral surface of the outer tube on its axially second end side. A liquid chamber is defined between the first and second elastomeric members and contains a liquid encapsulated therein.

With the above arrangement, the liquid chamber, containing a liquid encapsulated therein, is defined between the first and second elastomeric members by axially coupling the assembly, which is integrally formed by the inner tube, the first elastomeric member and the outer tube, to the second elastomeric member. The first and second elastomeric members can be produced separately. Hence, it is easy not only to finely regulate the axial and radial spring characteristics of the first and second elastomeric members, but also to establish any sectional shape for the liquid chamber.

To achieve the above second object, according to a third aspect and feature of the present invention, there is provided a liquid encapsulated bushing comprising an inner tube supporting a spherical portion which is formed on a support shaft for rotation by an inner peripheral surface thereof. A substantially cylindrical elastomeric member is fixed to an outer peripheral surface of the inner tube and has a circumferentially extending annular groove on its outer peripheral surface. A ring is fixed to the outer peripheral surface of the elastomeric member, so that at least a portion of the annular groove is exposed. An outer tube is fixed to an outer peripheral surface of the ring by drawing the outer tube radially inwards. A liquid chamber is defined between the annular groove and the outer tube and contains a liquid encapsulated therein.

With the above arrangement, when the assembly integrally formed by the inner tube, the elastomeric member and the ring is immersed in the liquid and the outer tube is placed over this assembly and fixed thereto by drawing thereof, the liquid is automatically encapsulated between the annular groove in the elastomeric member and the outer tube (namely, in the liquid chamber). Therefore, the operation of encapsulating the liquid into the liquid chamber can be easily performed.

The above and other objects, features and advantages of the invention will become apparent from the following description of the preferred embodiments taken in conjunction with the accompanying drawings.

BRIEF DESCRIPTION OF THE DRAWINGS

FIGS. 1 to 5 show a first embodiment of the present invention, wherein

FIG. 1 is a perspective view of a front suspension using a liquid encapsulated bushing;

FIG. 2 is an enlarged sectional view taken along a line 2—2 in FIG. 1;

FIG. 3 is a view showing a step of assembling a liquid encapsulated bushing;

FIG. 4 is a view showing a step of press-fitting the liquid encapsulated bushing into a support member;

FIG. 5 is a graph showing the characteristic of the liquid encapsulated bushing;

FIGS. 8 and 9 show a second embodiment of the present invention, wherein

FIG. 8 is a view similar to FIG. 2;

FIG. 9 is a view showing a step of assembling a liquid encapsulated bushing;

FIGS. 10 and 11 show a third embodiment of the present invention, wherein

FIG. 10 is a view similar to FIG. 2;

FIG. 11 is a view showing a step of assembling a liquid encapsulated bushing;

FIGS. 15 to 20 show a sixth embodiment of the present invention, wherein

FIG. 15 is a perspective view of a rear suspension using a liquid encapsulated bushing;

FIG. 16 is an enlarged sectional view taken along a line 16—16 in FIG. 15;

FIGS. 17 to 19 are views showing a step of assembling a liquid encapsulated bushing;

FIG. 20 is a graph showing the characteristic of the liquid encapsulated bushing;

DETAILED DESCRIPTION OF THE PREFERRED EMBODIMENTS

A first embodiment of the present invention will now be described with reference to FIGS. 1 to 5.

Figure 1:
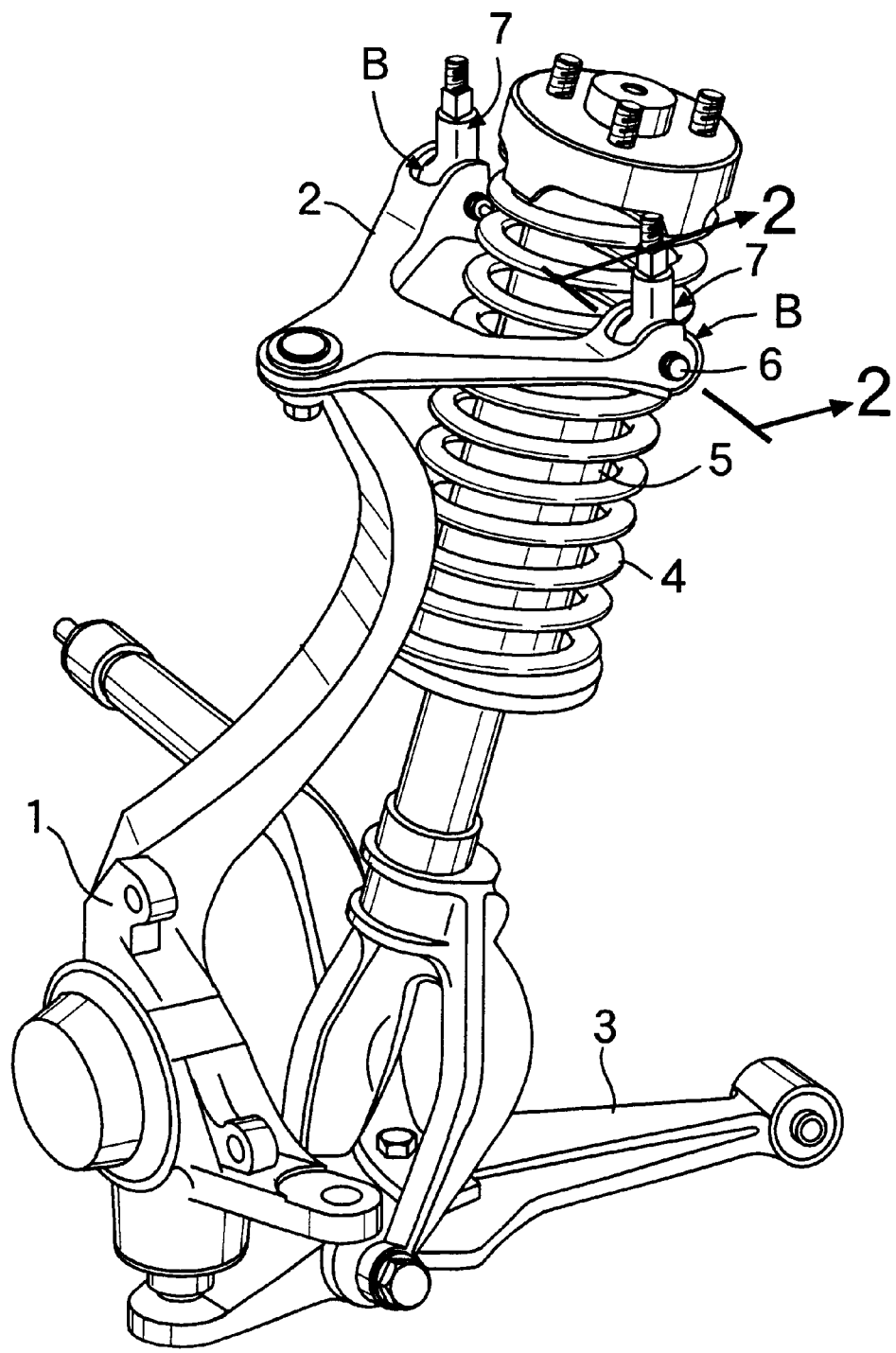

FIG. 1 shows a suspension for a left front wheel of an automobile. A knuckle 1, for rotatably supporting a wheel which is not shown, is integrally connected to a vehicle body by an upper arm 2 and a lower arm 3. The vertical movement of the knuckle 1 is buffered by a shock absorber 5 integrally provided with a coil spring 4. A liquid-encapsulated bushing B according to this embodiment is used, for example, for supporting a bifurcated inner end of the upper arm 2 on the vehicle body.

Figure 2:
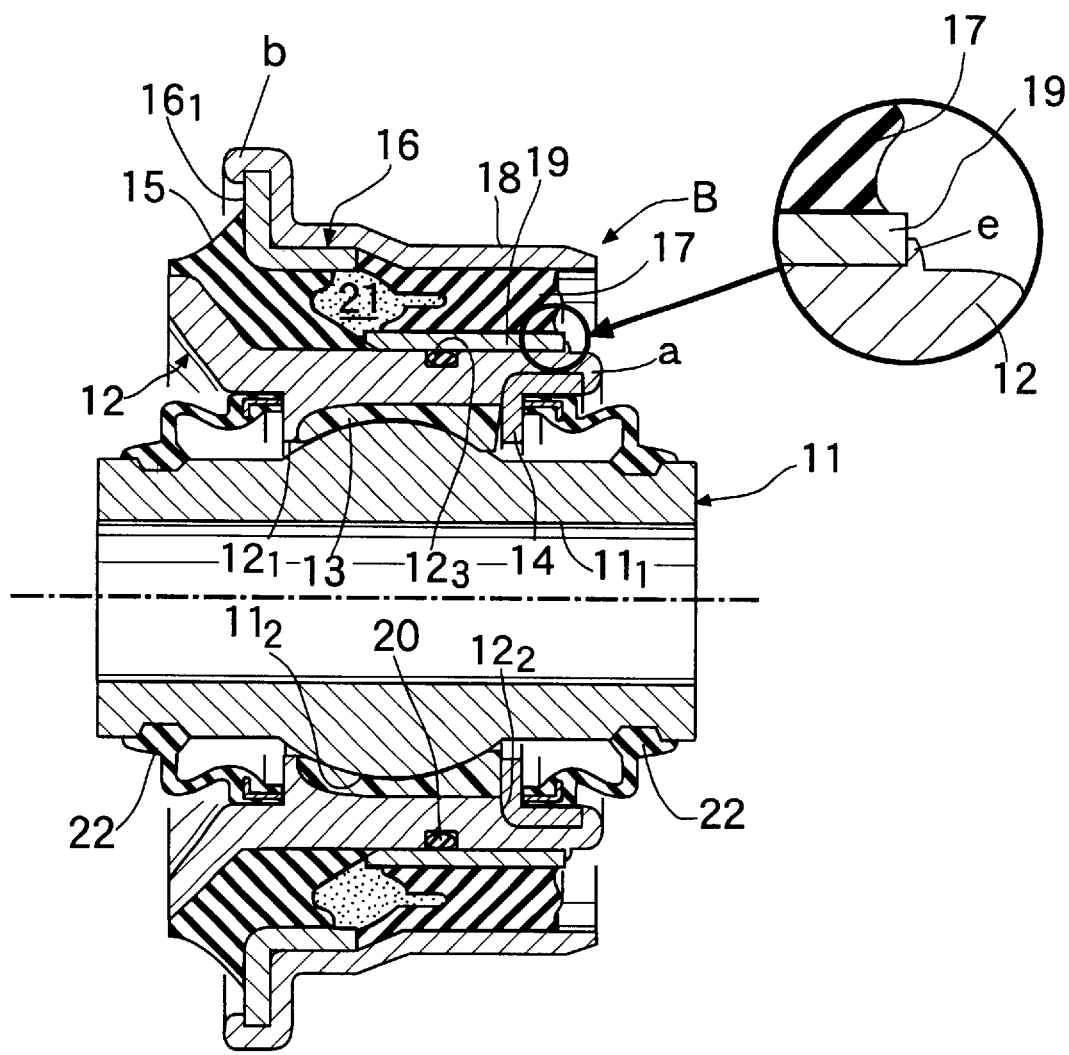

As shown in FIG. 2, the liquid-encapsulated bushing B has a support shaft 11 which is a hollow member having a bolt bore $11_1$ through which a bolt 6 (see FIG. 1), for fixing the support shaft 11 to the vehicle body, is inserted. A spherical portion $11_2$ is integrally formed axially centrally on the support shaft 11. The spherical portion $11_2$ of the support shaft 11 is rotatably supported on a bearing 13 which is made of a synthetic resin and which is fixed to an inner peripheral surface of an inner tube 12. The bearing 13 is supported by a retainer 14 which is fixed by caulking a. The axially right end of the bearing 13 abuts against a step $12_2$ which is formed on the inner peripheral surface of the inner tube 12. The axially left end of the bearing 13 abuts against a flange $12_1$ which is formed on the inner peripheral surface of the inner tube 12.

An inner peripheral surface of a first annular bushing rubber 15 is fixed to an axially left-hand outer peripheral surface of the inner tube 12 by a vulcanizing/baking adhesion. An inner peripheral surface of a first collar 16 is fixed to an outer peripheral surface of the first bushing rubber 15 by a vulcanizing/baking adhesion. The first bushing rubber 15 constitutes a first elastomer member in the present invention. A second bushing rubber 17 is fixed to an axially right-hand inner peripheral surface of an outer tube 18 which is disposed outside the inner tube 12 by a vulcanizing/baking adhesion. An outer peripheral surface of a second collar 19 is fixed to an inner peripheral surface of the second bushing rubber 17 by a vulcanizing/baking adhesion. The first collar 16 includes a flat flange $16_1$ extending radially. The axial spring constant of the first bushing rubber 15 is enhanced by coupling the first bushing rubber 15 to the flange $16_1$.

An O-ring 20 is mounted in an annular groove $12_3$ defined in the outer peripheral surface of the inner tube 12. The outer peripheral surface of the inner tube 12 and the inner peripheral surface of the second collar 19 are sealed to each other via the O-ring 20. In addition, the inner tube 12 and the second collar 19 are also sealed to each other via the left end of the second collar 19 being pushed against the right end of the inner periphery of the first bushing rubber 15. The left end of the outer tube 18 is fixed to the first collar 16 by a caulking b. At this time, the outer tube 18 and the first collar 16 are sealed to each other via the right end of the first collar 16 being pushed against the left end of the outer periphery of the second bushing rubber 17. An annular liquid chamber 21, containing a liquid encapsulated therein, is defined between the first and second bushing rubbers 15 and 17.

Boots 22 are mounted between a left end of the support shaft 11 and the inner tube 12 and between a right end of the support shaft 11 and the retainer 14, respectively, so that dust cannot adhere to contact surfaces of the spherical portion $11_2$ of the support shaft 11 and the bearing 13.

The steps for producing the liquid encapsulated bushing B having the above-described arrangement will be described below with reference to FIG. 3.

Figure 3:
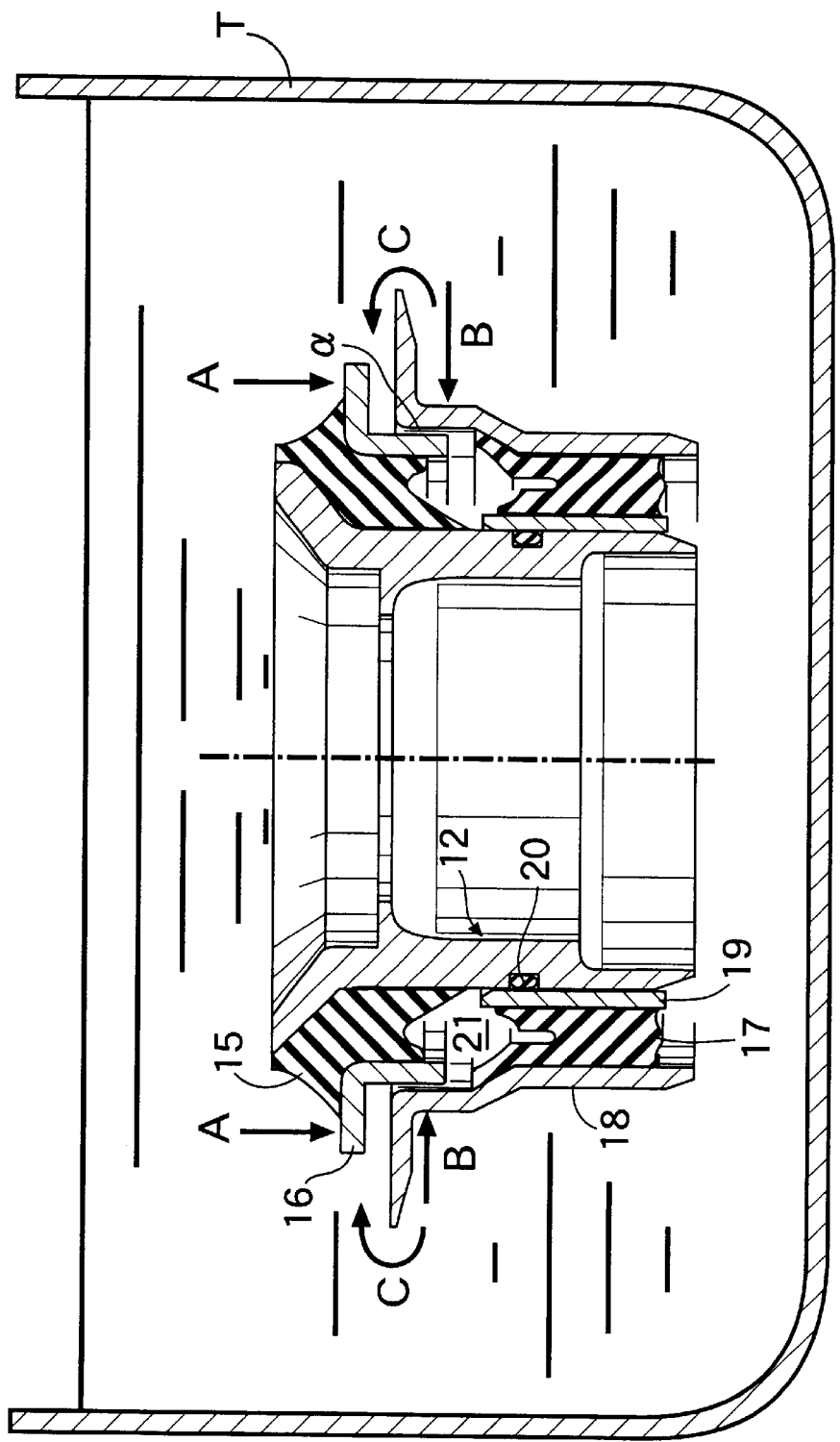

First, as shown in FIG. 3, in a condition in which an assembly, which is integrally formed by the outer tube 18, the second bushing rubber 17 and the second collar 19, has been submerged in a liquid tank T filled with a liquid, an assembly integrally formed by the inner tube 12, the first bushing rubber and the first collar 16 is inserted and press-fitted in a direction of an arrow A, so that the outer peripheral surface of the inner tube 12 and the inner peripheral surface of the second collar 19 are brought into close contact with each other through the O-ring 20. At this time, a radial clearance α is defined between the first collar 16 and the outer tube 18. Therefore, not only the fitting of the outer tube 18 to the first collar 16 is easily made, but also the surplus of the liquid encapsulated in the liquid chamber 21, which is defined between the first bushing rubber 15 and the second bushing rubber 17 can be discharged through the clearance a into the liquid tank T.

Next, the inner peripheral surface of the outer tube 18 is brought into close contact with the outer peripheral surface of the first collar 16 by drawing the outer tube 18 radially inwards (in a direction of an arrow B), thereby encapsulating the liquid into the liquid chamber 21. The end of the outer tube 18 is caulked in a direction of an arrow C and thus coupled to the first collar 16. The withdrawal of the second collar 19 can be reliably prevented by fixing the outer periphery of the inner tube 12 after press-fitting of the second collar 19 by a caulking a, as shown in a circle in FIG. 2.

The assembly, which is integrally formed by the inner tube 12, the first bushing rubber 15, the first collar 16, the second bushing rubber 17, the outer tube 18 and the second collar 19 in the above manner, is removed from the liquid tank T and then, the bearing 13, the support shaft 11, the retainer 14 and the boots 22 are assembled inside the inner tube 12, as shown in FIG. 2a.

Figure 4:
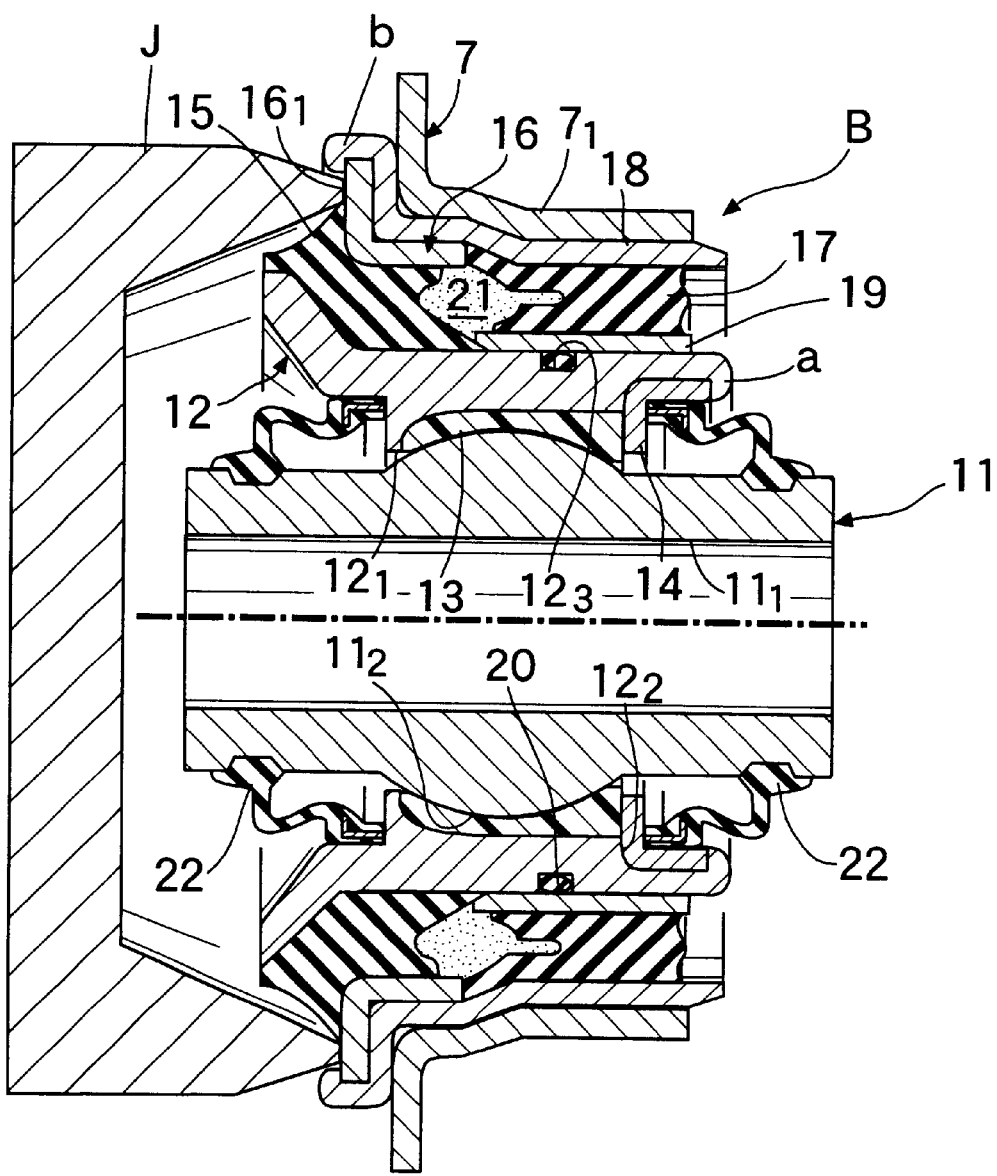
Figure 5:
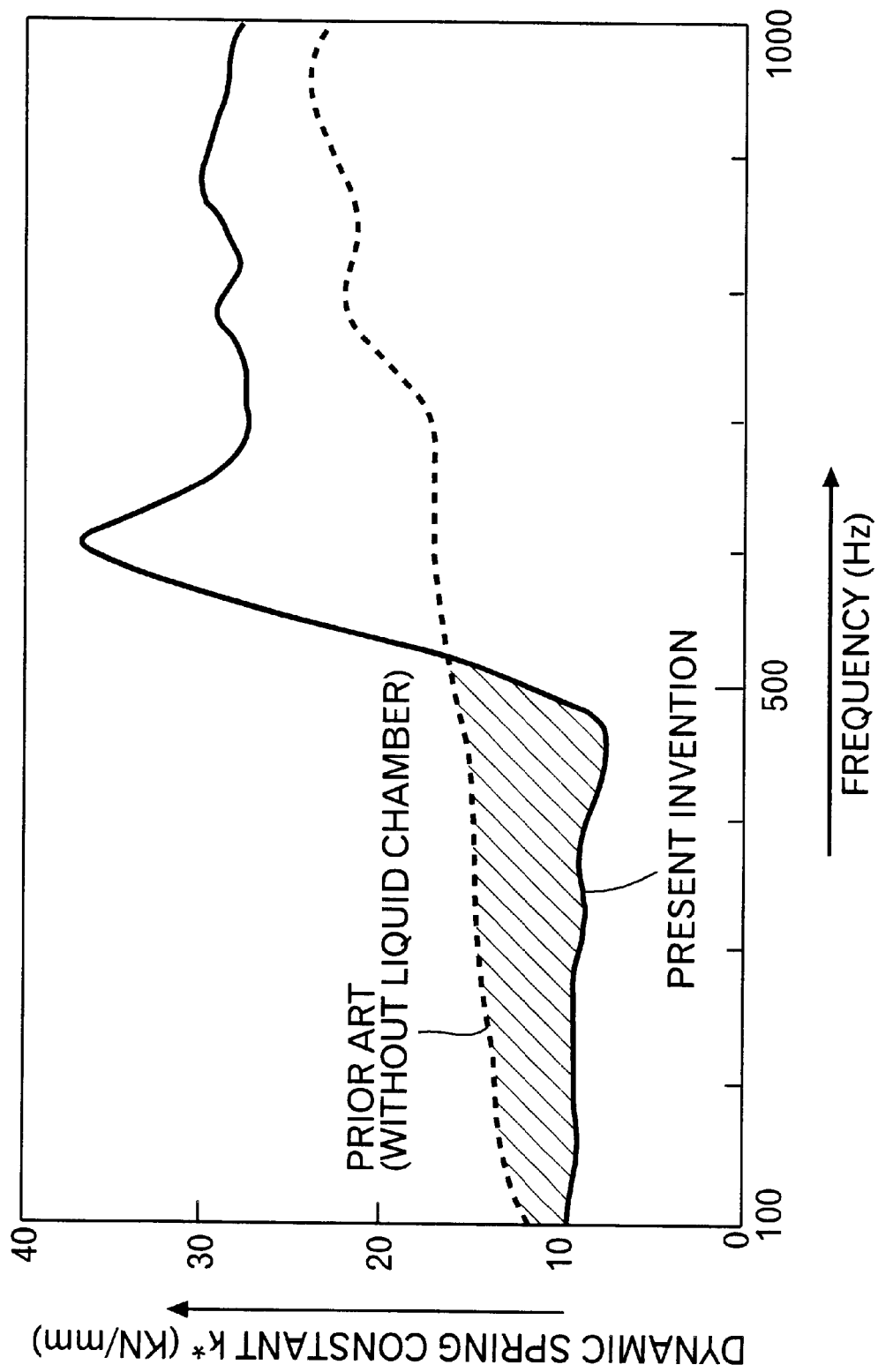

In the liquid encapsulated bushing B produced in the above manner, as shown in FIG. 1, the support shaft 11 has been fixed to the inner end of the upper arm 2 by the bolt 6 passed through the bolt bore $11_1$, and the outer tube 18 has been fixed to the annular mounting portion of the support member 7 to the vehicle body by press-fitting. When the outer tube 18 of the liquid encapsulated bushing B is press-fitted into the mounting portion $7_1$ of the support member 7, as shown in FIG. 4, the flange $16_1$ of the first collar 16 is utilized as a load receiving surface which receives a load of a press-fitting jig J. Hence, the press-fitting operation can be easily carried out.

When the upper arm 2 is rotated due to the vertical movement of the knuckle 1, the bearing 13 which is carried on the upper arm 2 and the spherical portion $11_2$ of the support shaft 11 which is supported on the vehicle body slide on each other in a spherical surface contact state to permit the smooth rotation of the upper arm 2. When a load is applied from the knuckle 1 to the upper arm 2, the load is absorbed by the resilient deformation of the first and second bushing rubbers 15 and 17 of the liquid encapsulated bushing B. When the first and second bushing rubbers 15 and 17 are resiliently deformed by the load to cause the inner and outer tubes 12 and 18 to be displaced diametrically relative to each other, thereby increasing and decreasing the volumes on diametrically one and other sides of the annular liquid chamber 21, the liquid flows from the volume-decreased side to the volume-increased side to generate a liquid column resonance phenomenon within the liquid chamber 21. As a result, the dynamic spring constant of the liquid encapsulated bushing B is decreased to effectively reduce the load noise.

The decrease in dynamic spring constant is also achieved by softening the first and second bushing rubbers 15 and 17. However, if the first and second bushing rubbers 15 and 17 are softened, the static spring constant is also decreased. Thus, a reduction in rigidity of the suspension in a camber direction is caused, resulting in a degraded steering stability performance. According to the present embodiment, however, the dynamic spring constant can be decreased without decreasing the static spring constant. Hence, the steering stability performance and the vibration proofing performance can be reconciled. It can be seen that in the liquid encapsulated bushing B having the liquid chamber 21 in the present embodiment, the dynamic spring constant is decreased in a normal frequency region shown by the shaded portion in FIG. 5, as compared with the known bushing having no liquid chamber.

Thus, the liquid chamber 21 can be automatically defined between the first and second bushing rubbers 15 and 17 only by axially coupling the assembly integrally formed by the inner tube 12 and the first bushing rubber 15 and the assembly integrally formed by the outer tube 18 and the second bushing rubber 17 to each other. At this time, the materials and shapes of the first and second bushing rubbers 15 and 17 can be determined independently from each other. Hence, it is easy to finely regulate the axial and radial spring characteristics of the first and second bushing rubbers 15 and 17. Moreover, the sectional shape of the liquid chamber 21 can be changed to any shape. Hence, it is also easy to determine the liquid column resonance characteristic.

When the inner tube 12 and the outer tube 18 are coupled in the liquid, as shown in FIG. 3, the liquid escapes from the clearance α, so that the pressure in the liquid chamber 21 does not rise. However, when the outer tube 18 is drawn in the direction of the arrow B, the volume of the liquid chamber 21 is slightly decreased. For this reason, there is a possibility that the pressure in the liquid chamber 21 may be changed to cause dispersions in static and dynamic spring constants of the liquid-encapsulated bushing B.

Figure 6:
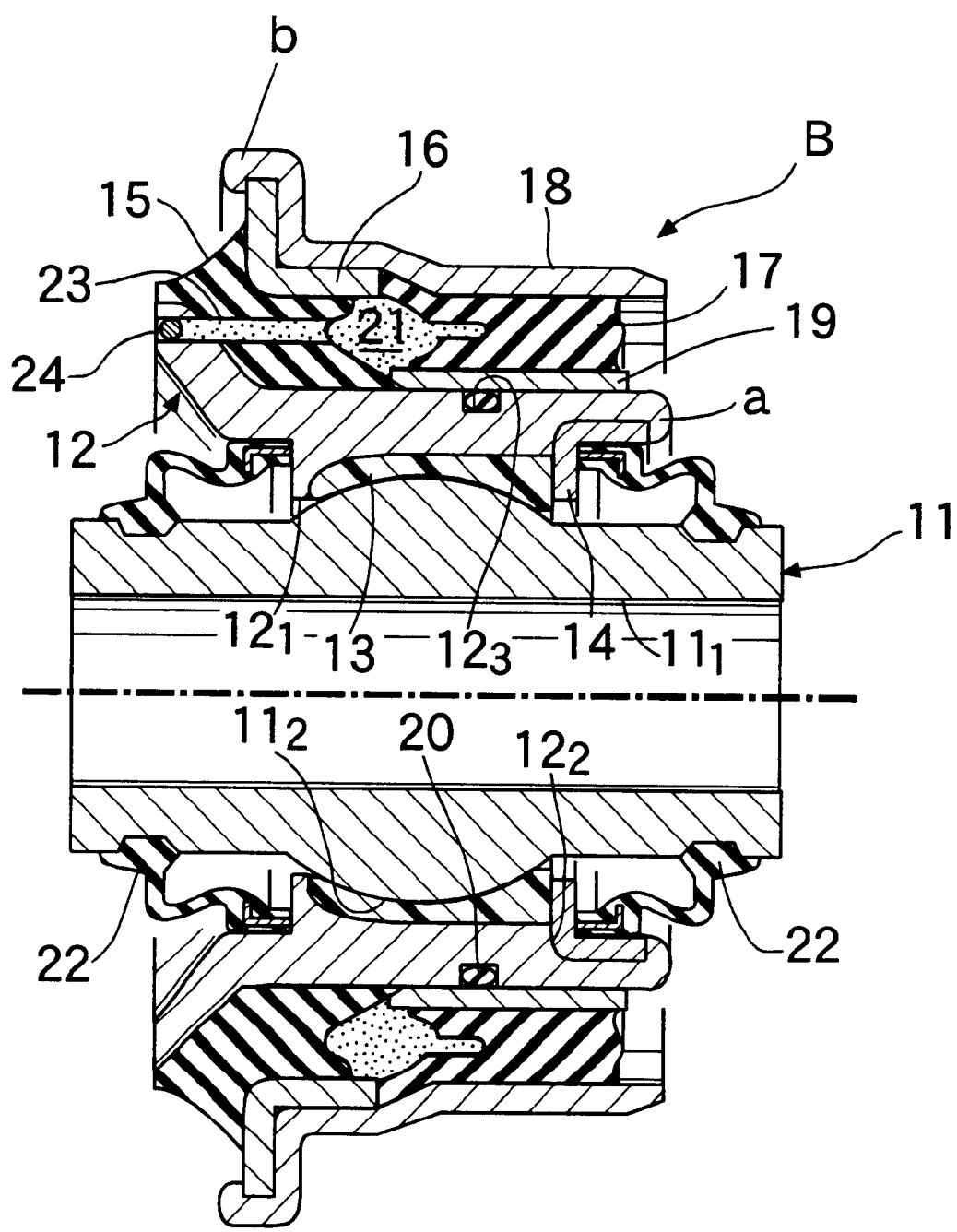
FIG. 6 is a view showing a first modification to the first embodiment.
Figure 7:
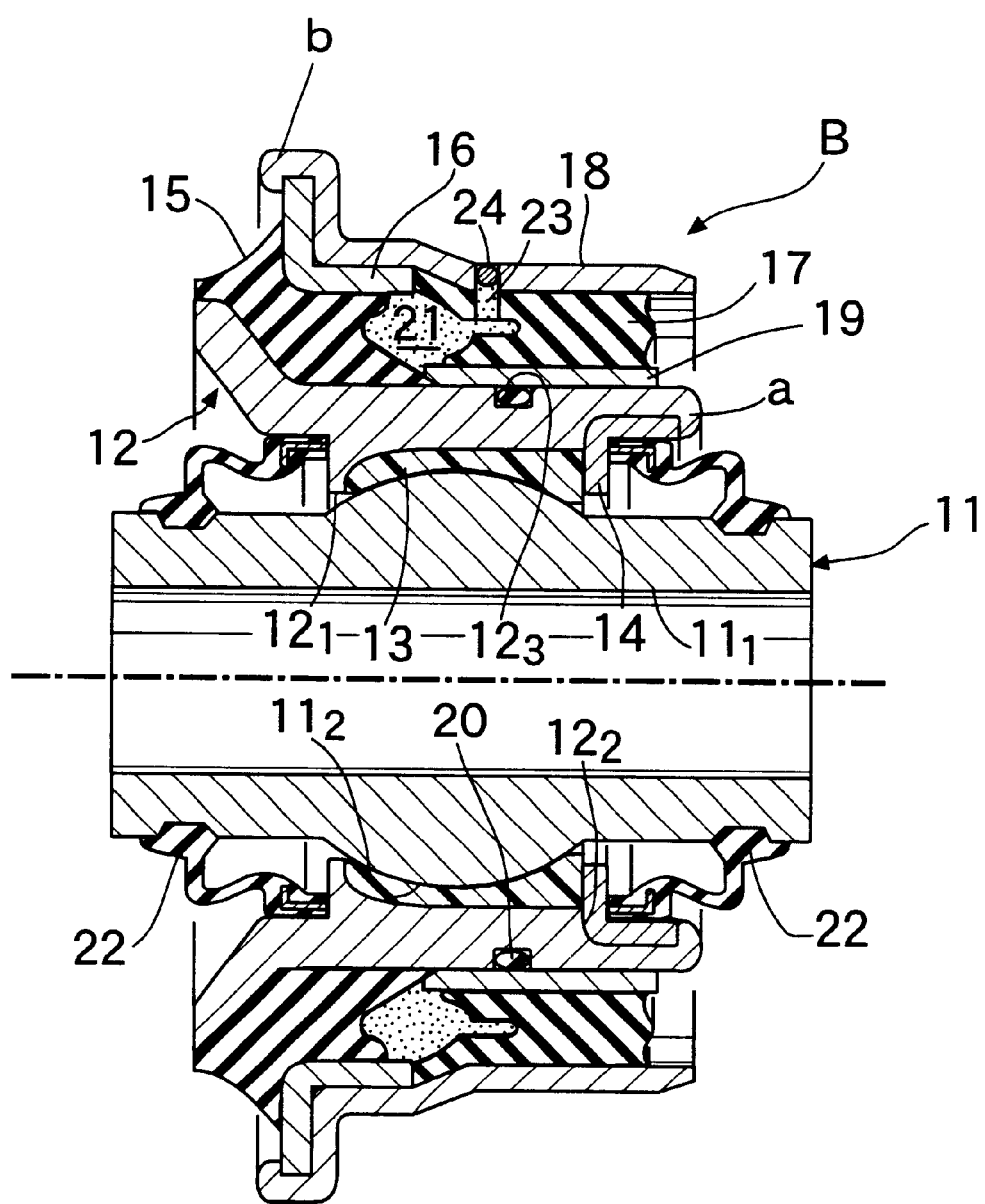
FIG. 7 is a view showing a second modification to the first embodiment.

Therefore, in a first modification shown in FIG. 6, a liquid injecting bore 23 is made through the first bushing rubber 15 and the inner tube 12, and the liquid chamber 21 is evacuated therethrough. Then, the liquid is injected through the liquid injecting bore 23 into the liquid chamber 21. After injection of the liquid, the liquid injecting bore 23 is occluded with a ball 24 (or a rivet or the like). Thus, the internal pressure in the liquid chamber 21 can be maintained constant, thereby stabilizing the static and dynamic spring constants of the liquid encapsulated bushing B. In another modification shown in FIG. 7, a liquid injecting bore 23 and a ball 24 may be provided in the second bushing rubber 17 and the outer tube 18. Alternatively, after the liquid chamber 21 is filled with the liquid by assembly in the liquid, the liquid injecting bore 23 may be occluded with the ball 24.

A second embodiment of the present invention will now be described with reference to FIGS. 8 and 9.

Figure 8:
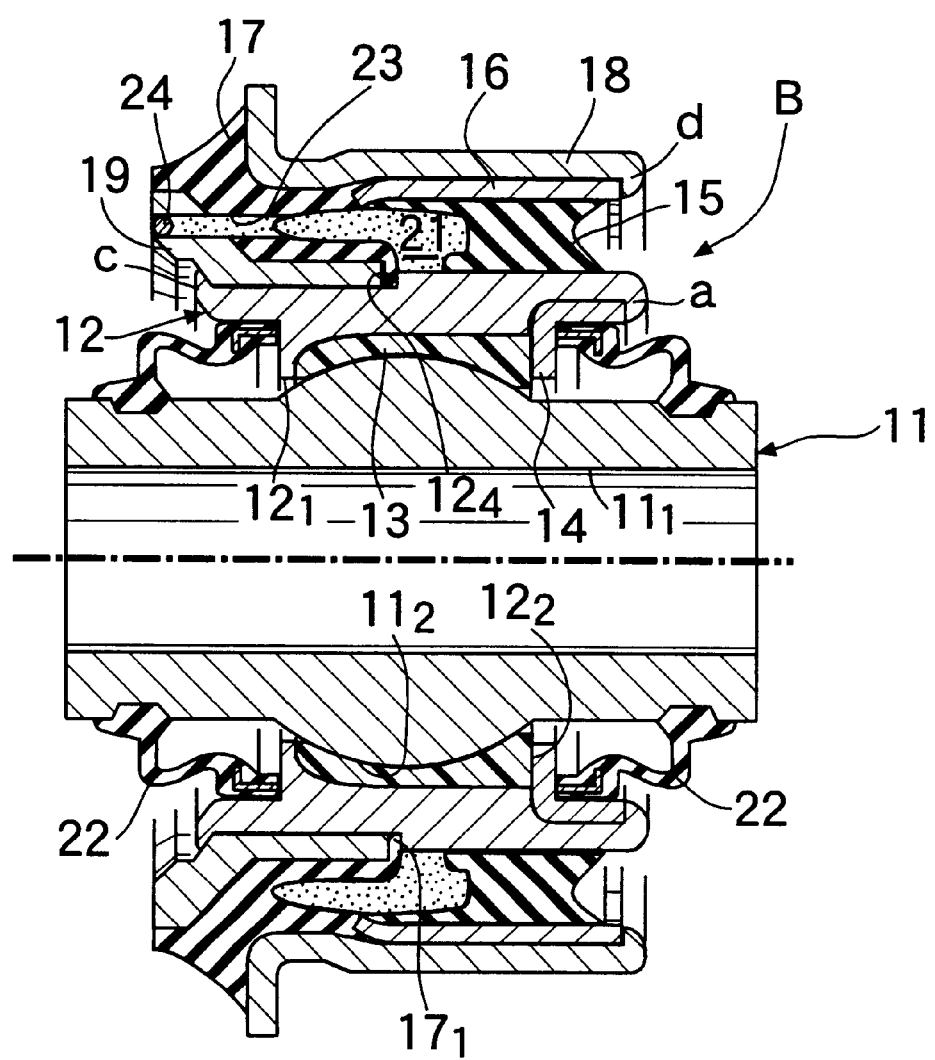
Figure 9:
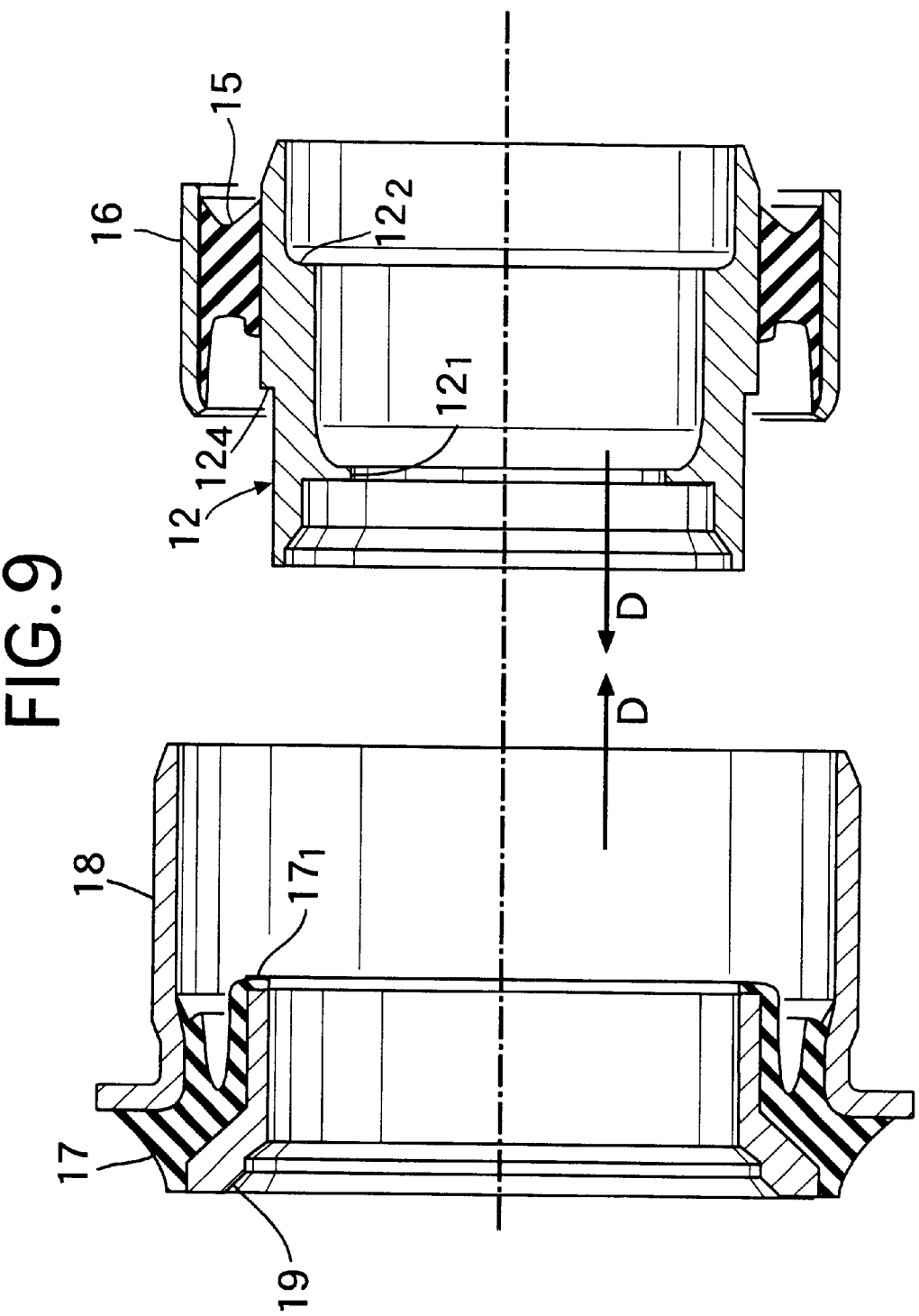

As apparent from comparison of FIGS. 2 and 8 with each other, in the first embodiment shown in FIG. 2, the first bushing rubber 15 which is fixed to the inner tube 12 is disposed on the axially left side, and the second bushing rubber 17 which is fixed to the outer tube 18 is disposed on the axially right side. In the second embodiment shown in FIG. 8, the positional relationship between the first and second bushing rubbers 15 and 17 is reversed, i.e., the first bushing rubber 15 which is fixed to the inner tube 12 is disposed on the axially right side, and the second bushing rubber 17 which is fixed to the outer tube 18 is disposed on the axially left side.

Thus, after the inner tube 12 and the outer tube 18 are moved toward each other in directions of arrows D and coupled to each other, the left end of the inner tube 12 is fixed to the left end of the second collar 19 by a caulking c. Further, the right end of the outer tube 18 is fixed to the right end of the first collar 16 by a caulking d, as shown in FIG. 8. As a result, the inner tube 12 and the second collar 19 are sealed to each other with a sealing portion $17_1$ of the second bushing rubber 17 interposed between a step $12_4$ of the inner tube 12 and the right end of the second collar 19. The first collar 16 and the second bushing rubber 17 are sealed to each other with the left end of the first collar 16 pushed against the right end of the outer periphery of the second bushing rubber 17, thereby preventing the liquid from leaking out of the liquid chamber 21.

With the second embodiment, the fixing of the inner tube 12 and the second collar 19 to each other and the fixing of the outer tube 18 and the first collar 16 to each other are performed by the caulkings c and d, respectively. Hence, the reliability of the assembling is enhanced.

Figure 10:
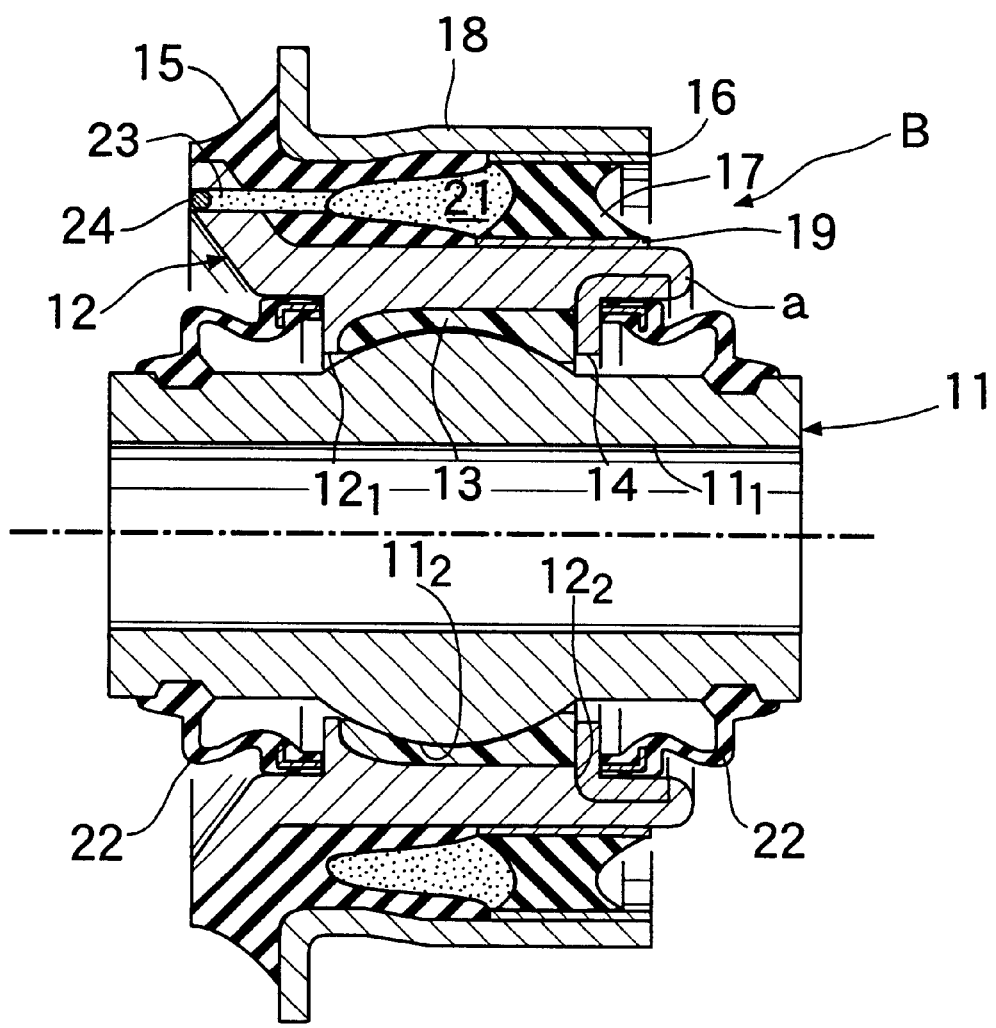
Figure 11:
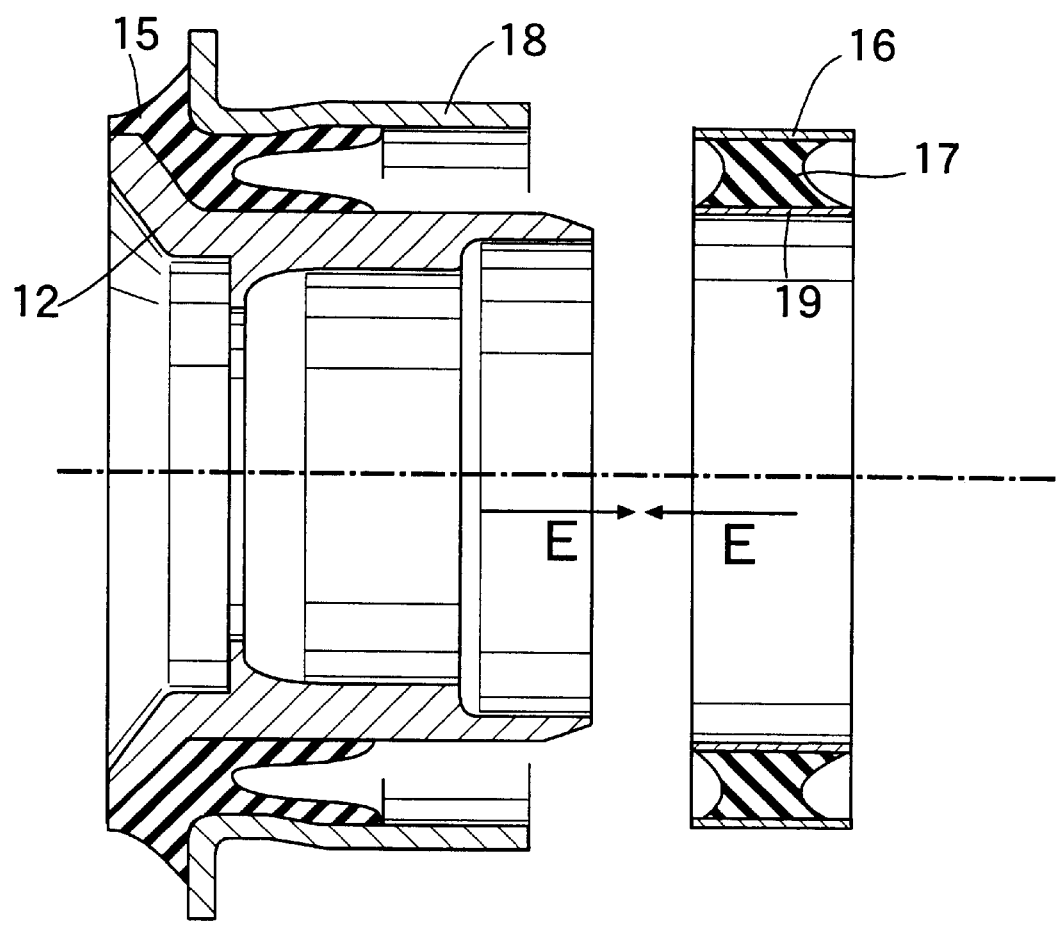

A third embodiment of the present invention will now be described with reference to FIGS. 10 and 11.

In a liquid encapsulated bushing B according to the third embodiment, left portions of an inner tube 12 and an outer tube 18 are previously integrally coupled to each other by a first bushing rubber 15. A second bushing rubber 17 has a first collar 16 and a second collar 19 which are fixed to outer and inner peripheries thereof, respectively. The second bushing rubber 17 is press-fitted into, in a direction of an arrow E in FIG. 11, and assembled to an assembly integrally formed by the inner tube 12, the outer tube 18 and the first bushing rubber 15.

With the third embodiment, the second bushing rubber 17 having the first collar 16 and the second collar 19 fixed thereto is separate from the inner tube 12 and the outer tube 18. Thus, a reduction in size is achieved. Hence, the vulcanizing formation thereof can be facilitated, leading to a reduced cost.

Figure 12:
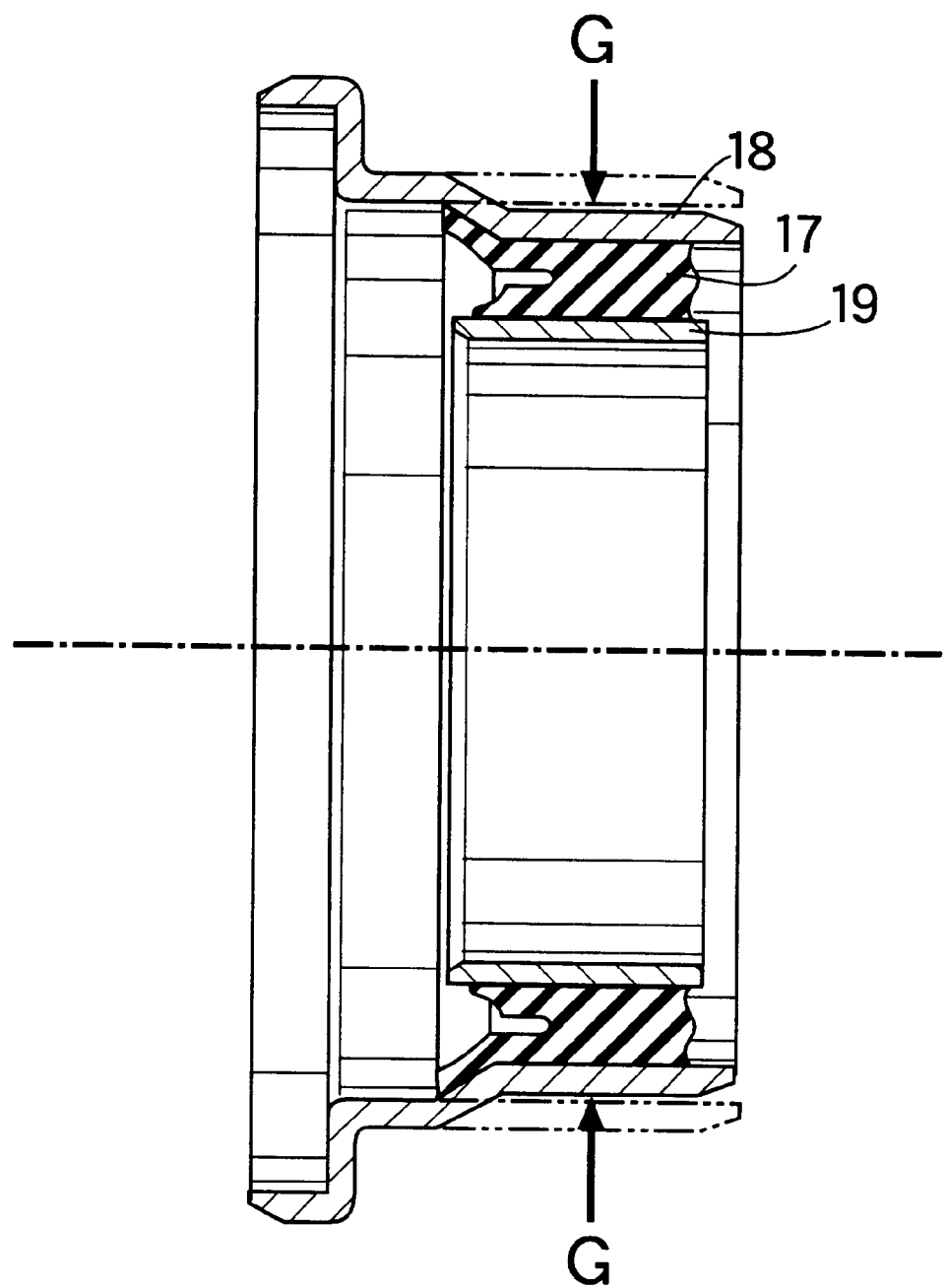
FIG. 12 is a view showing a step of assembling a liquid encapsulated bushing according to a fourth embodiment.

FIG. 12 shows a fourth embodiment of the present invention. In a liquid encapsulated bushing B according to the fourth embodiment, an assembly integrally formed of an outer tube 18, a second bushing rubber 17 and a second collar 19 is previously subjected to a drawing treatment in which the outer tube 18 is drawn in a direction of an arrow G from a position shown by a dashed line to a position shown by a solid line. The resulting assembly of the outer tube 18, the second bushing rubber 17 and the second collar 19 is placed outside the inner tube 12 and subjected to a drawing treatment, as shown in FIG. 3, thereby allowing the clearance a between the outer tube 18 and the first collar 16 to disappear. With the fourth embodiment, a preload can be applied to the second bushing rubber 17 to enhance durability thereof.

Figure 13:
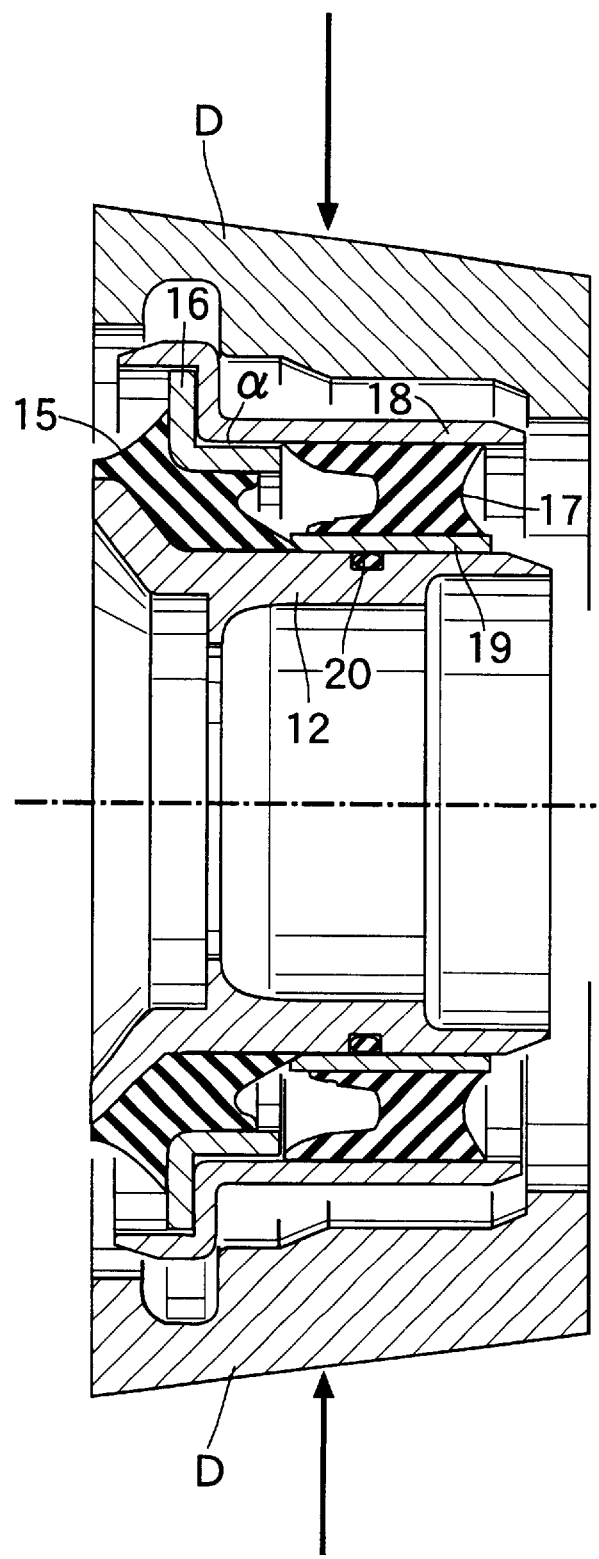
FIGS. 13 and 14 are views showing a step of assembling a liquid encapsulated bushing according to a fifth embodiment.
Figure 14:
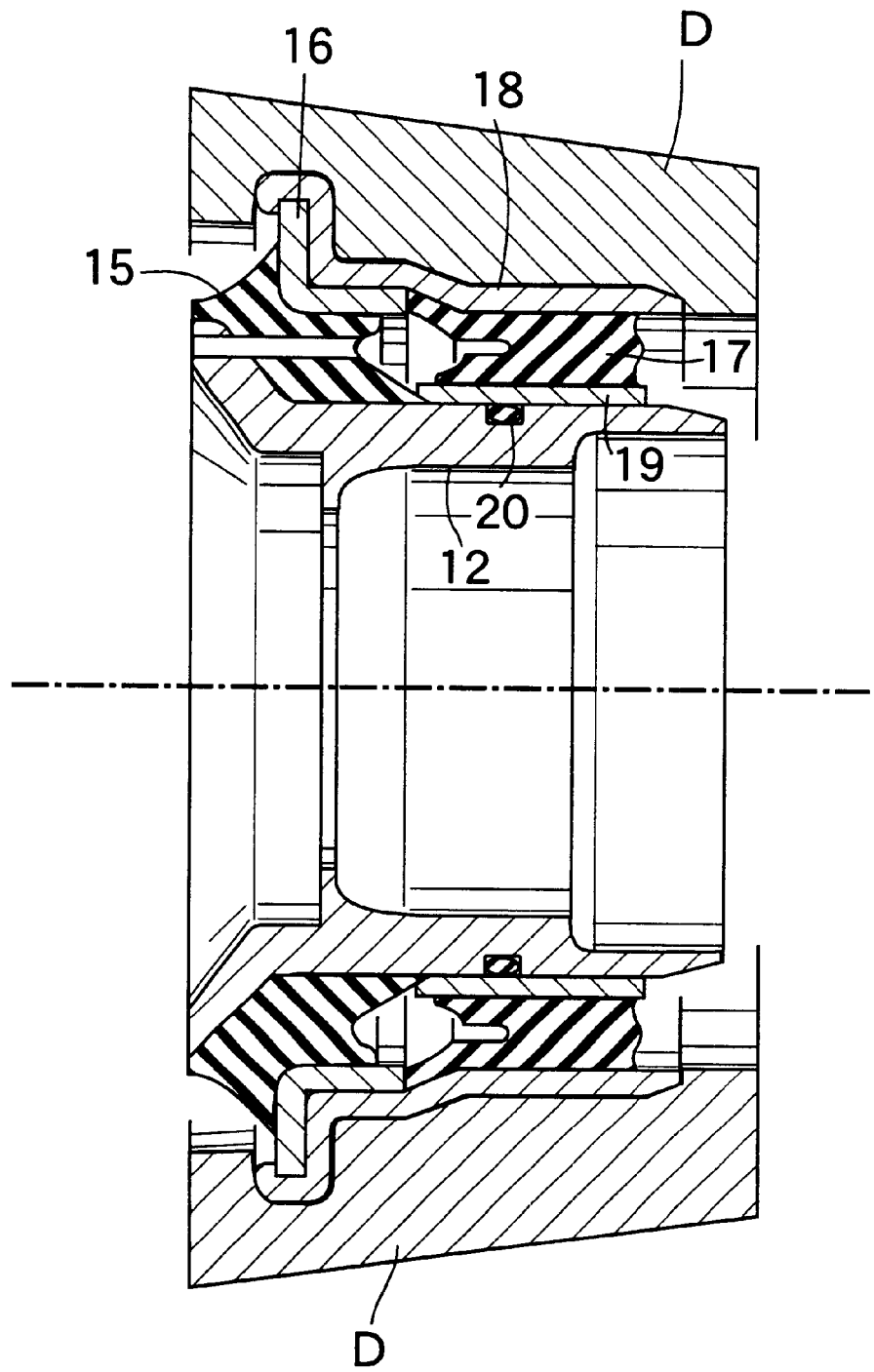

FIGS. 13 and 14 show a fifth embodiment of the present invention. In the fifth embodiment, the following steps can be completed at a single stage using dies D: a step of compressing a second bushing rubber 17 by drawing an outer tube 18 radially inwards to apply a preload to the second bushing rubber 17 (see the fourth embodiment), a step of allowing the clearance α between the outer tube 18 and a first collar 16 to disappear, and a step of caulking a left end of the outer tube 18 to fix the outer tube 18 to the first collar 16.

A sixth embodiment of the present invention will now be described with reference to FIGS. 15 to 20.

Figure 15:
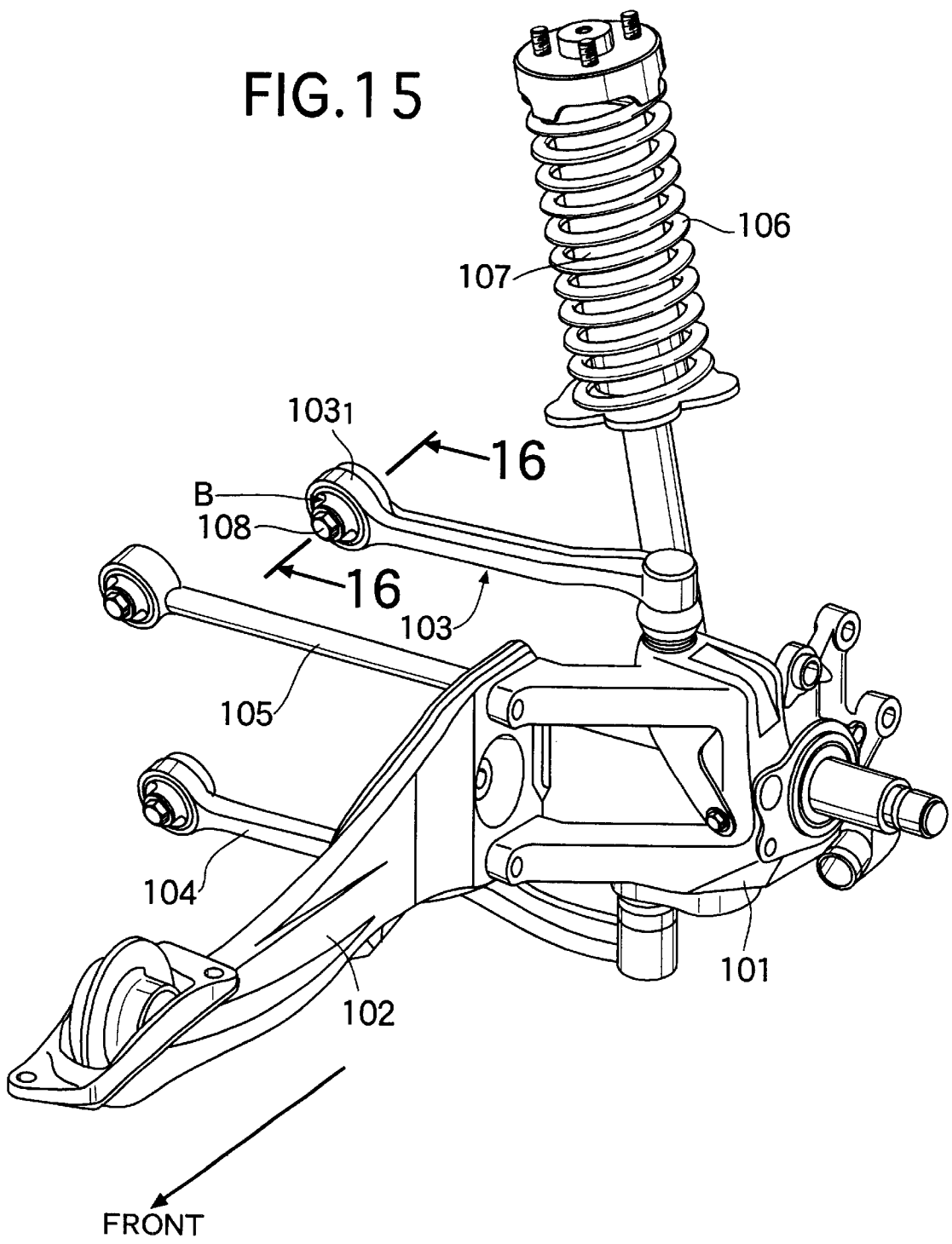

FIG. 15 shows a suspension for a left rear wheel of an automobile. A knuckle 101, for rotatably supporting a wheel which is not shown, is connected to a vehicle body by a radius rod 102 extending forwardly and by an upper arm 103. A front lower arm 104 and a rear lower arm 105 extend laterally. The vertical movement of the knuckle 101 is buffered by a shock absorber 107 integrally provided with a coil spring 106. A liquid encapsulated bushing B according to this embodiment is used, for example, for supporting an inner end of the upper arm 103 on the vehicle body.

Figure 16:
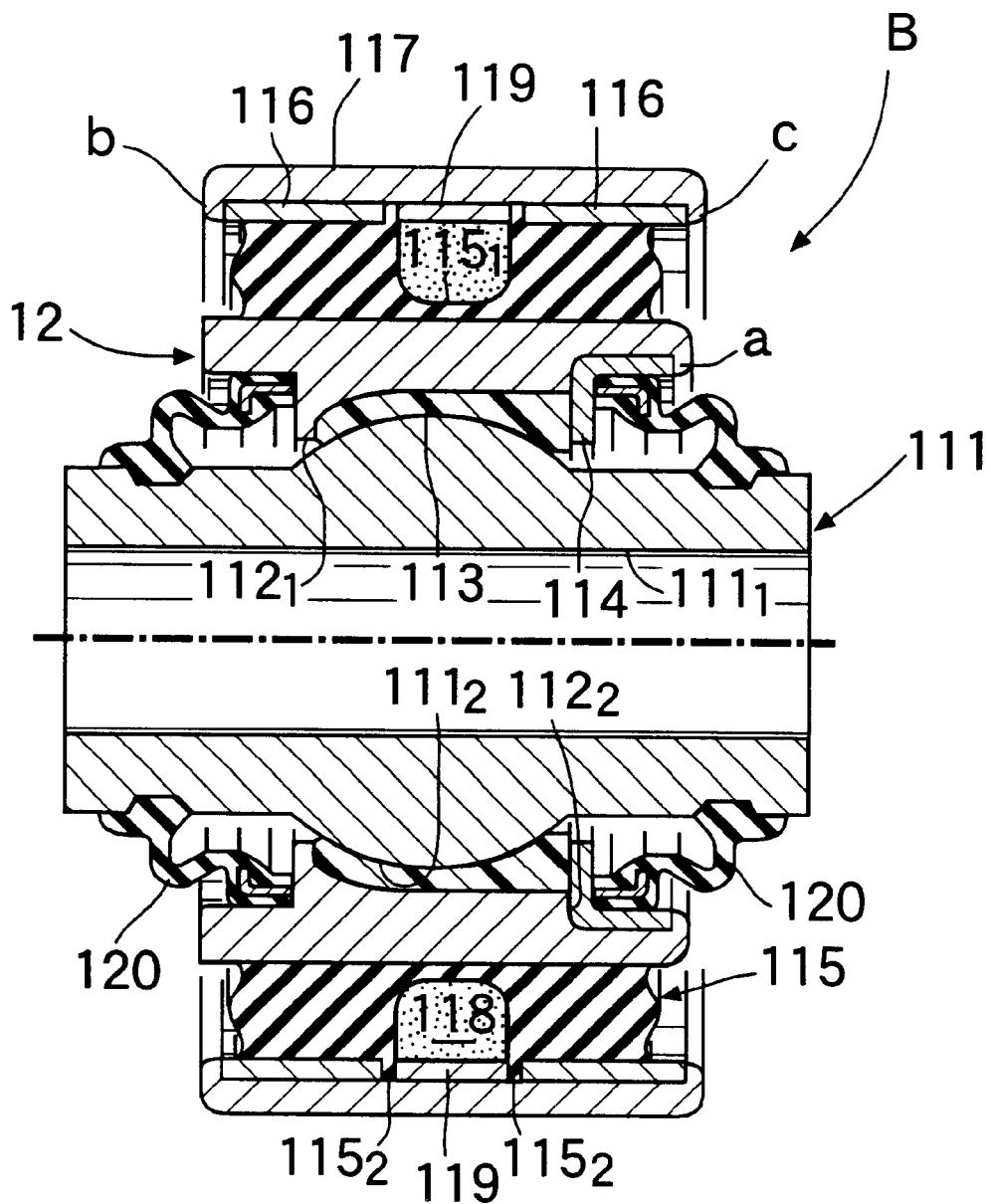

As shown in FIG. 16, the liquid encapsulated bushing B has a support shaft 111 which is a hollow member having a boft bore $111_1$ through which a bolt 108 (see FIG. 15), for fixing the liquid encapsulated bushing B to the vehicle body, is passed. A spherical portion $111_2$ is integrally formed axially centrally on the support shaft 111. The spherical portion $111_2$ of the support shaft 111 is rotatably carried on a bearing 113 which is made of a synthetic resin and which is fixed to an inner peripheral surface of an inner tube 112. The bearing 113 is supported by a retainer 114 which is fixed by a caulking a. An axially one end of the bearing 113 is pushed against a flange $112_1$ formed on an inner peripheral surface of an inner tube 112. An axially other end of the bearing 113 is pushed against a step $112_2$ which is formed on the inner peripheral surface of the inner tube 112.

An inner peripheral surface of a substantially cylindrical bushing rubber 115 is fixed to an outer peripheral surface of the inner tube 112 by a vulcanizing and baking adhesion. Inner peripheral surfaces of two rings 116, which are spaced apart from each other, are fixed to an outer peripheral surface of the bushing rubber 115 by a vulcanizing and baking adhesion. The bushing rubber 115 constitutes an elastomeric member in the present invention. An annular groove $115_1$ is defined in the outer peripheral surface of the bushing rubber 115 and is interposed between the two rings 116. The annular groove $115_1$ extends over 360° circumferentially of the bushing rubber 115. An annular liquid chamber 118, containing a liquid encapsulated therein, is defined between the annular groove $115_1$ of the bushing rubber 115 and an inner peripheral surface of the outer tube 117 by placing the outer tube 117 over outer peripheries of the two rings 116 and fixing the outer tube 117 to the two rings 116 in a method which will be described hereinafter.

At this time, two spacers 119 (see FIG. 17), which are each formed into an arcuate shape having a center angle of 180°, are disposed in the liquid chamber 118 defined between the two rings 116. The reason why the spacers 119 are divided into two without being formed integrally into an annular shape is that they are mounted in the annular groove $115_1$ without interference with the rings 116. When the spacers 119 have been mounted, the sealing of the liquid chamber 118 is performed by interposing sealing portions $115_2$ of the bushing rubber 115 between the spacers 119 and the two rings 116. Boots 120, which are made of a rubber, are mounted between one end of the support shaft 111 and the inner tube 112 and between the other end of the support shaft 111 and the retainer 114, respectively. Thus, dust cannot be deposited on the contact surfaces of the spherical portions $111_2$ of the support shaft 111 and bearing 113.

Figure 18:
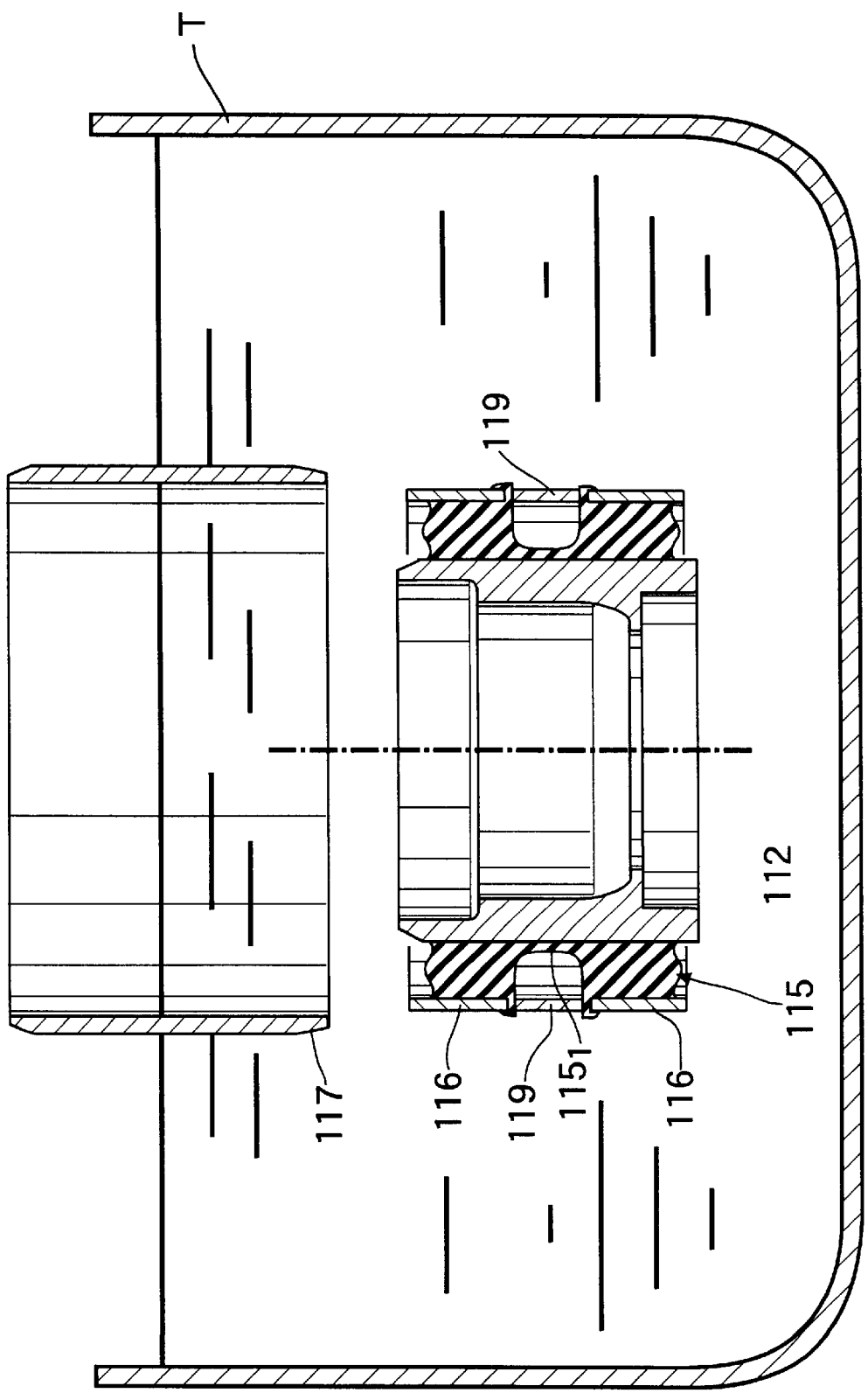
Figure 19:
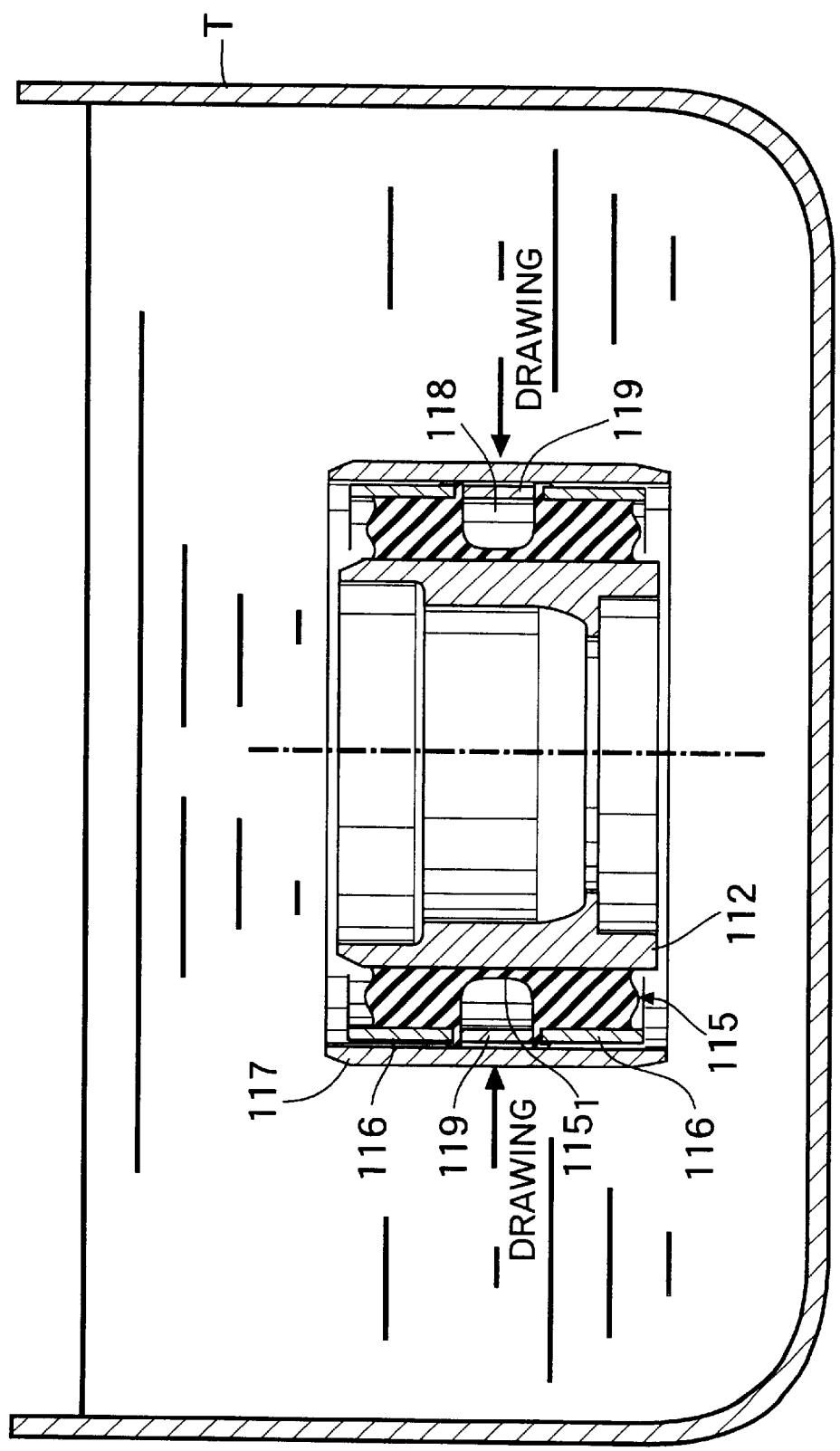

The steps of producing the liquid encapsulated bushing B having the above-described arrangement will be described below with reference to FIGS. FIGS. 17 to 19.

Figure 17:
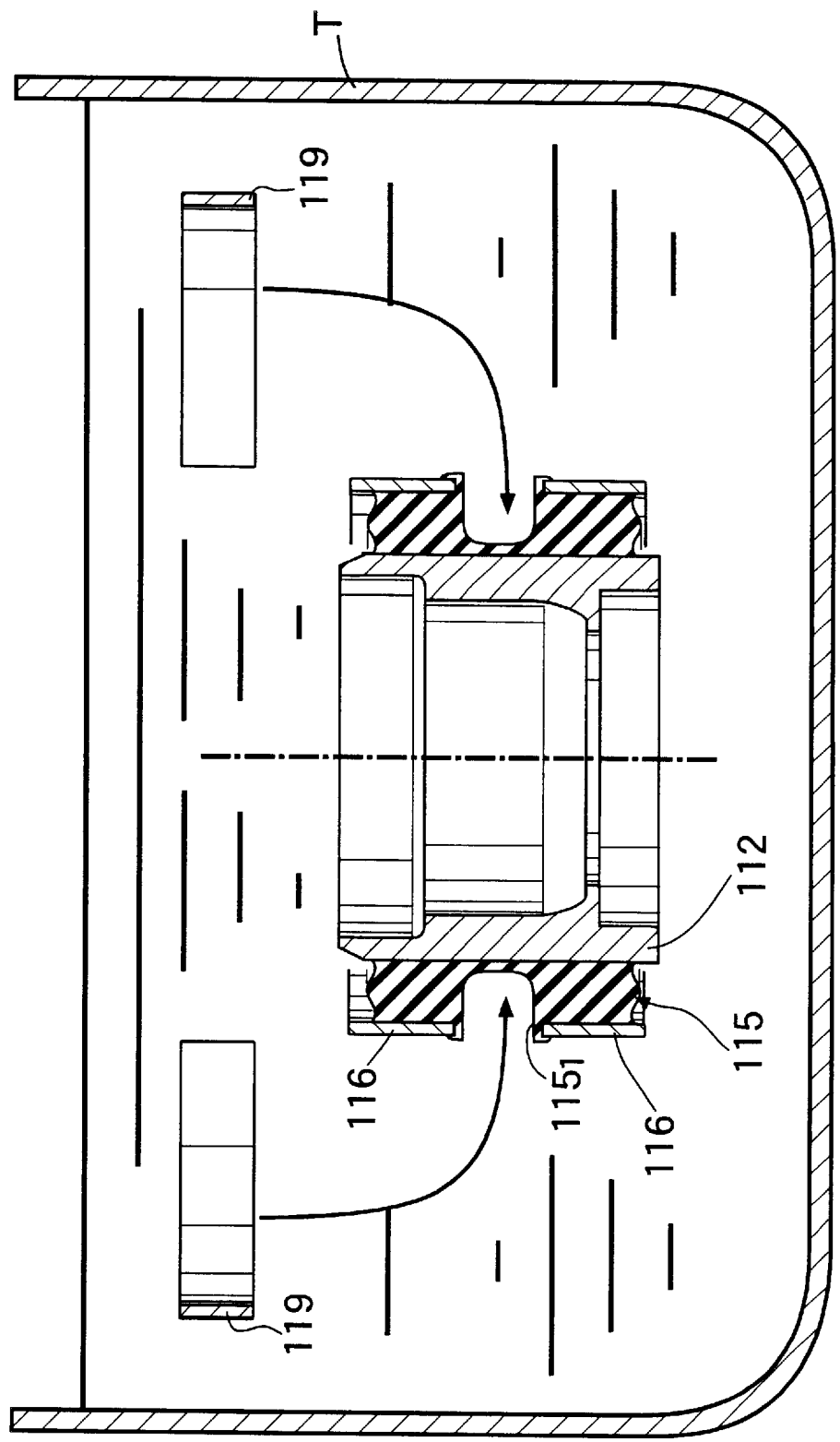

First, in a condition in which the assembly which is integrally formed by the inner tube 112, the bushing rubber 115 and the rings 116 has been submerged in the liquid tank T filled with the liquid, as shown in FIG. 17, the two-divided spacers 119 are mounted in the annular groove $115_1$ in the bushing rubber 115. Then, the outer tube 117 is fitted over the outsides of the rings 116 and the spacers 119, as shown in FIG. 18. Thereafter, the diameter of the outer tube 117 is reduced by drawing the outer tube 117 radially inwards as shown in FIG. 19, whereby the diameter of the outer tube 117 is reduced to fix the outer tube 117 to the outer peripheral surfaces of the rings 116 and the spacers 119. As a result, the annular chamber 118, containing the liquid encapsulated therein, is defined between the annular groove $115_1$ and the outer tube 117.

The assembly which is integrally formed by the inner tube 112, the bushing rubber 115, the rings 116, the outer tube 117 and the spacers 119 in the above manner is removed from the liquid tank T. Then, the bearing 113, the support shaft 111, the retainer 114 and the boots 120 are assembled to the inside of the inner tube 112, as shown in FIG. 16. At this time, in addition to the treatment of fixing the retainer 114 to the inner tube 112 by a caulking a, the treatment of fixing the axially opposite ends of the outer tube 117 to the rings 116 by caulkings b and c is carried out. It should be noted that the outer tube 117 is firmly fixed to the rings 116 even only by drawing the outer tube 117 radially inwards. Hence, the caulkings b and c can be omitted.

As shown in FIG. 15, the support shaft 111 of the liquid encapsulated bushing B produced in the above manner, is fixed to the vehicle body by the bolt 108 which is passed through the bolt bore $111_1$. The outer tube 117 is fixed to an annular support portion $103_1$ which is formed at the inner end of the upper arm 103 by press-fitting. When the upper arm 103 is rotated due to vertical movement of the knuckle 101, the bearing 113 which is carried on the upper arm 103 and the spherical portion $111_2$ of the support shaft 111 which is supported on the vehicle body slide on each other in a spherical surface contact state to permit the smooth rotation of the upper arm 103.

When a load is applied from the knuckle 101 to the upper arm 103, the load is absorbed by the resilient deformation of the bushing rubber 115 of the liquid encapsulated bushing B. When the bushing rubber 115 has been resiliently deformed by the load to relatively displace the inner tube 112 and the outer tube 117 diametrically, the volumes of diametrically one and the other sides of the annular liquid chamber 118 are caused to be alternately increased and decreased, and the liquid flows from the volume-decreased side to the volume-increased side to generate a liquid column resonance phenomenon in the liquid chamber 118. As a result, the dynamic spring constant of the liquid encapsulated bushing B is reduced to alleviate the load noise.

Figure 20:
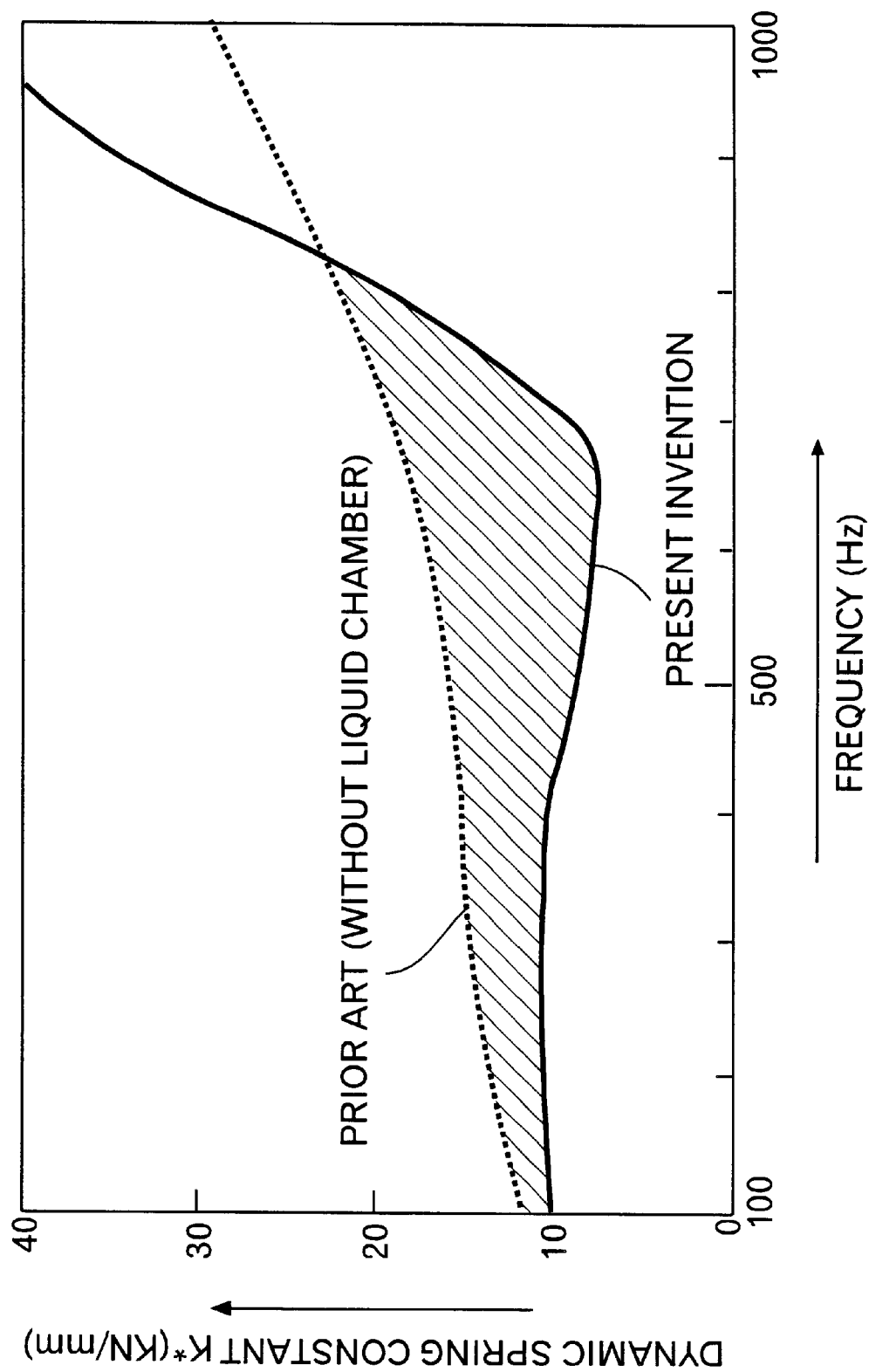

The reduction in dynamic spring constant can be achieved by softening the bushing rubber 115, but if the bushing rubber is softened, the static spring constant is also reduced simultaneously. Hence, the rigidity of the suspension in a camber direction is reduced, resulting in a degraded steering stability performance. According to this embodiment, however, the dynamic spring constant can be reduced without reducing the static spring constant. Hence, the steering stability performance and the vibration proofing performance can be reconciled. It can be seen that in the liquid encapsulated bushing B having the liquid chamber 118 according to this embodiment, the dynamic spring constant is reduced in a region shown by the oblique lines, as shown in FIG. 20, compared to the known bushing having no liquid chamber.

Thus, as described in the process for producing the liquid encapsulated bushing B, the liquid chamber 118, containing the liquid encapsulated therein, can be defined only by defining the annular groove $115_1$ in the outer peripheral surface of the bushing rubber 115 and by placing the outer tube 117 over the rings 116 which are fixed to the outer peripheral surface of the bushing rubber 115 in the liquid to fix the outer tube 117. Therefore, a step of defining a bore for injecting the liquid into the liquid chamber 118 and a step of occluding the bore are not required, leading to reduced manufacturing costs. If the bushing rubber 115 is deformed at the step of fixing the outer tube 117 to change the distance between the two rings 116, there is a possibility that the volume of the liquid chamber 118 may be changed which influences the vibration proofing performance. However, the distance between the two rings 116 can be maintained constant by the disposition of the spacers 119 in the liquid chamber 118 to prevent the reduction in the vibration proofing performance.

A seventh embodiment of the present invention will now be described with reference to FIGS. 21 to 24.

Figure 21:
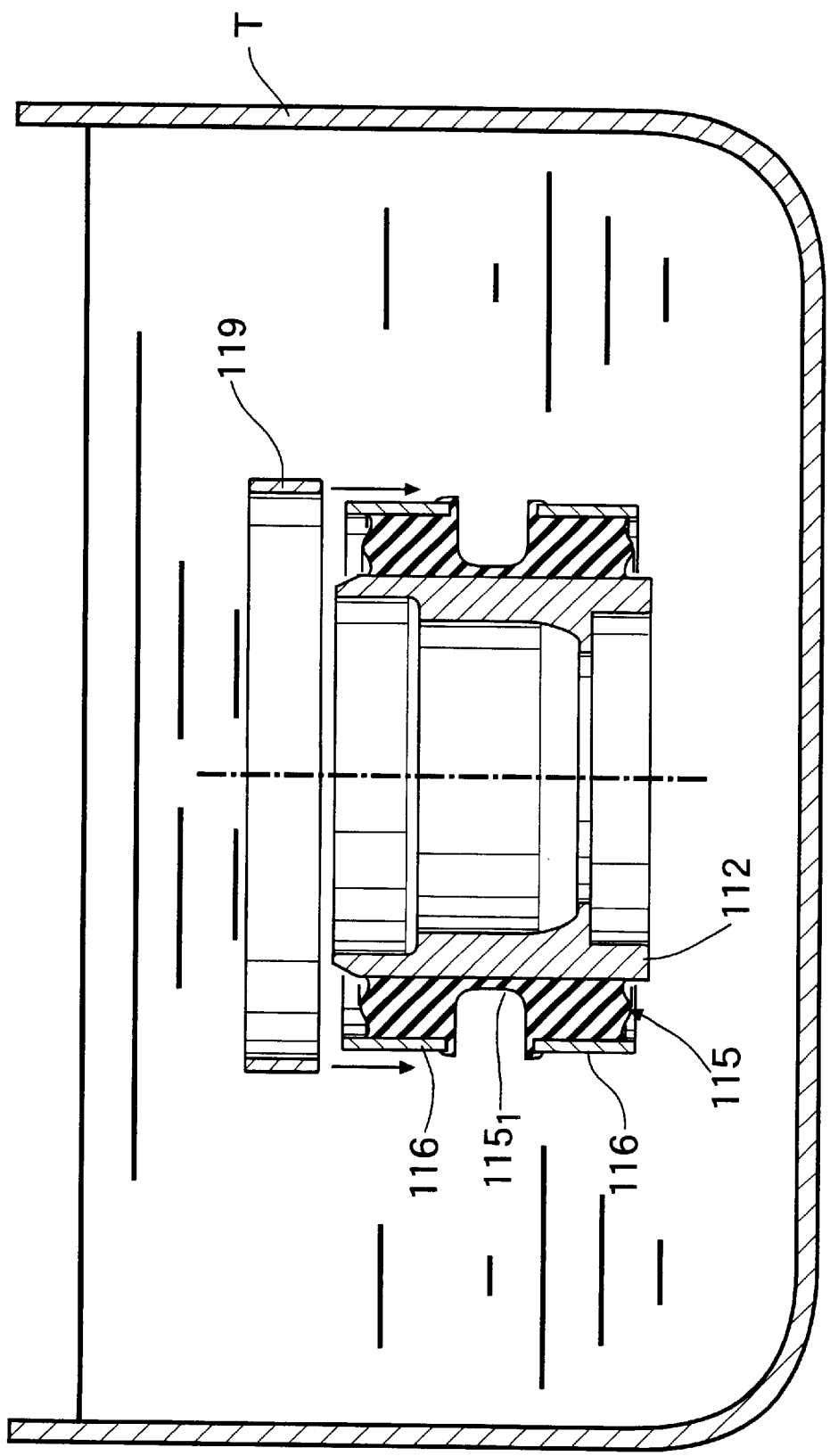
FIGS. 21 to 24 are views showing a step of assembling a liquid encapsulated bushing according to a seventh embodiment of the present invention.

The seventh embodiment is different from the sixth embodiment with respect to a spacer 119' and a method for assembling the spacer 119'. More specifically, although the spacers 119 in the sixth embodiment are divided into two, the spacer 119' in the seventh embodiment is integrally formed into an annular shape, with its diameter being slightly larger than the diameter of rings 116. Therefore, the spacer 119' can be placed over the outsides of the rings 116, as shown in FIG. 21.

Figure 22:
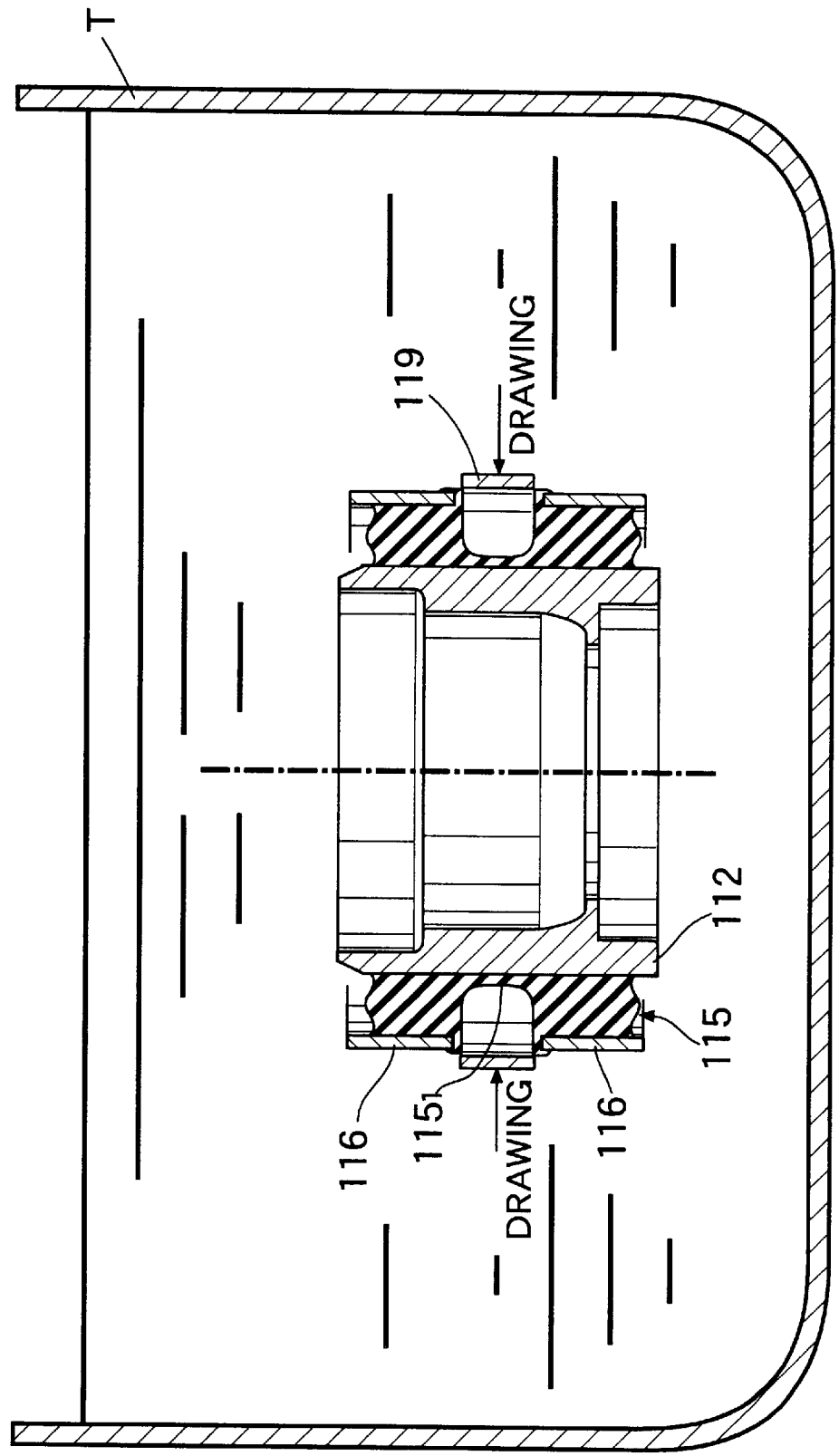
Figure 23:
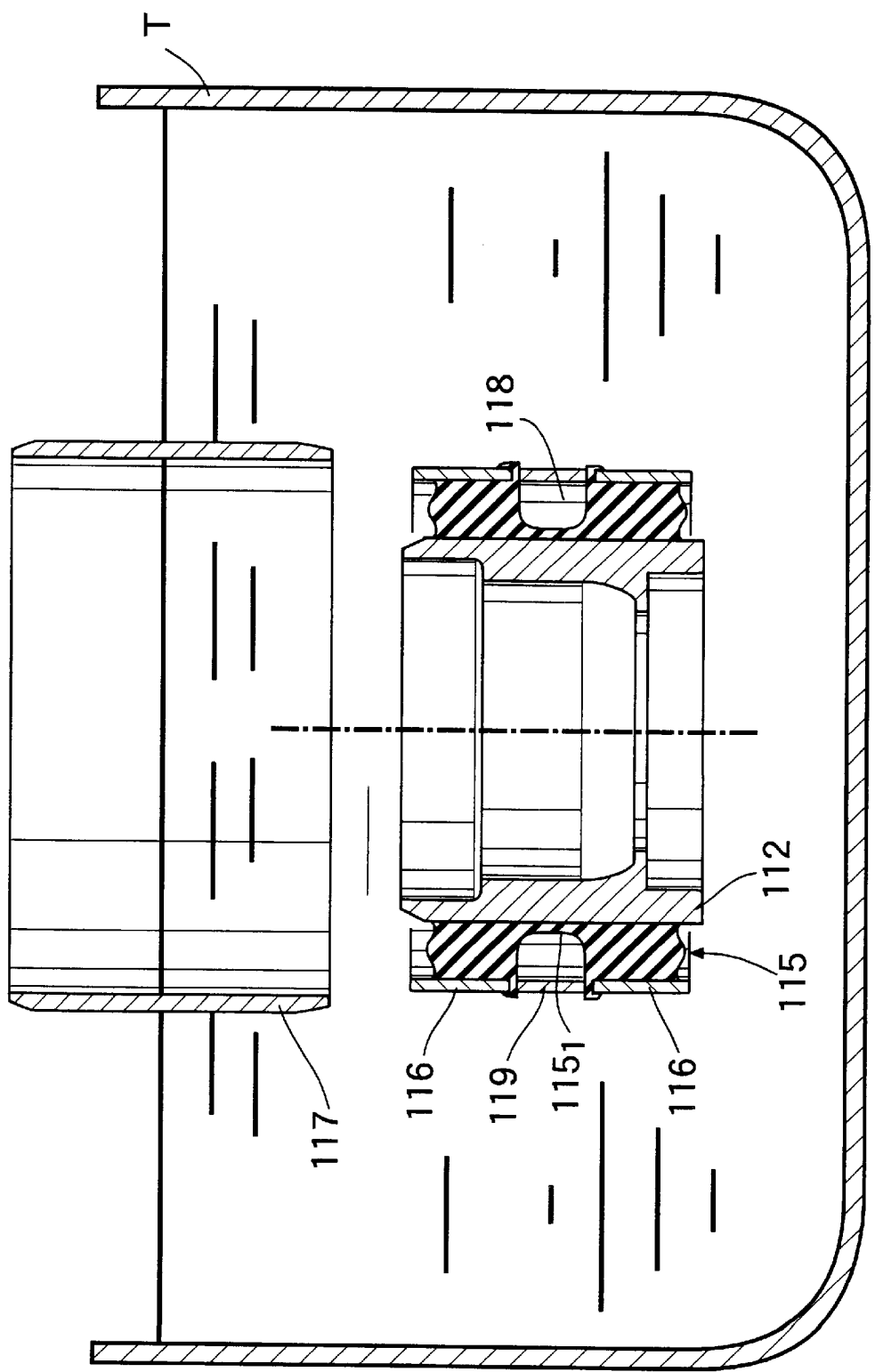
Figure 24:
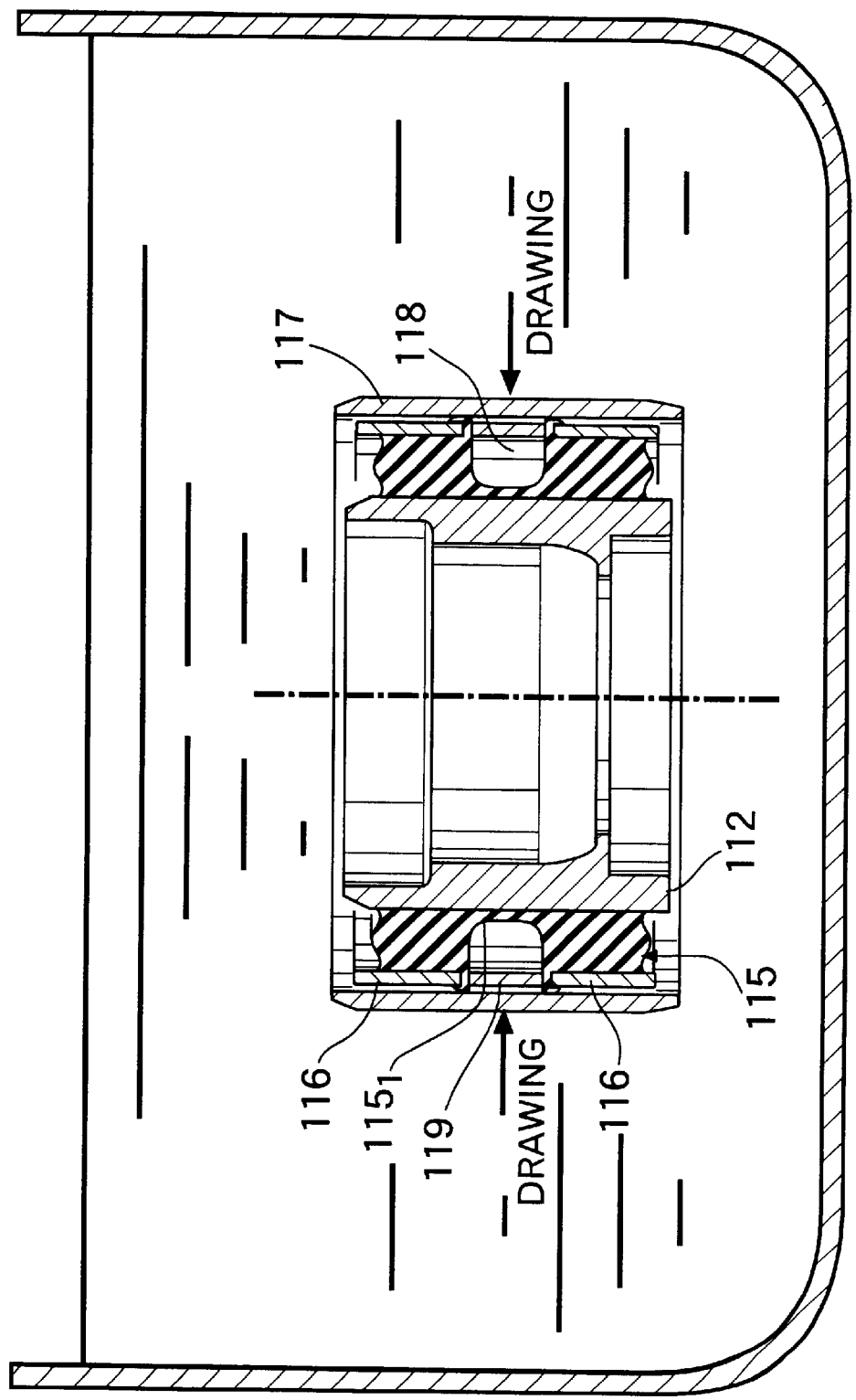

Then, the spacer 119' is drawn radially inwards, so that it has the same diameter as the rings 116 (see FIG. 22). Next, an outer tube 117 is placed over the outside of the rings 116 and the spacer 119' (see FIG. 23). The outer tube 117 is drawn radially inwards and fixed to the rings 116 and the spacer 119' (see FIG. 24).

With the seventh embodiment, it is not necessary to divide the spacer 119' into two pieces. Hence, a liquid encapsulated bushing B having the same performance as in the sixth embodiment can be produced with a smaller number of parts.

Figure 25:
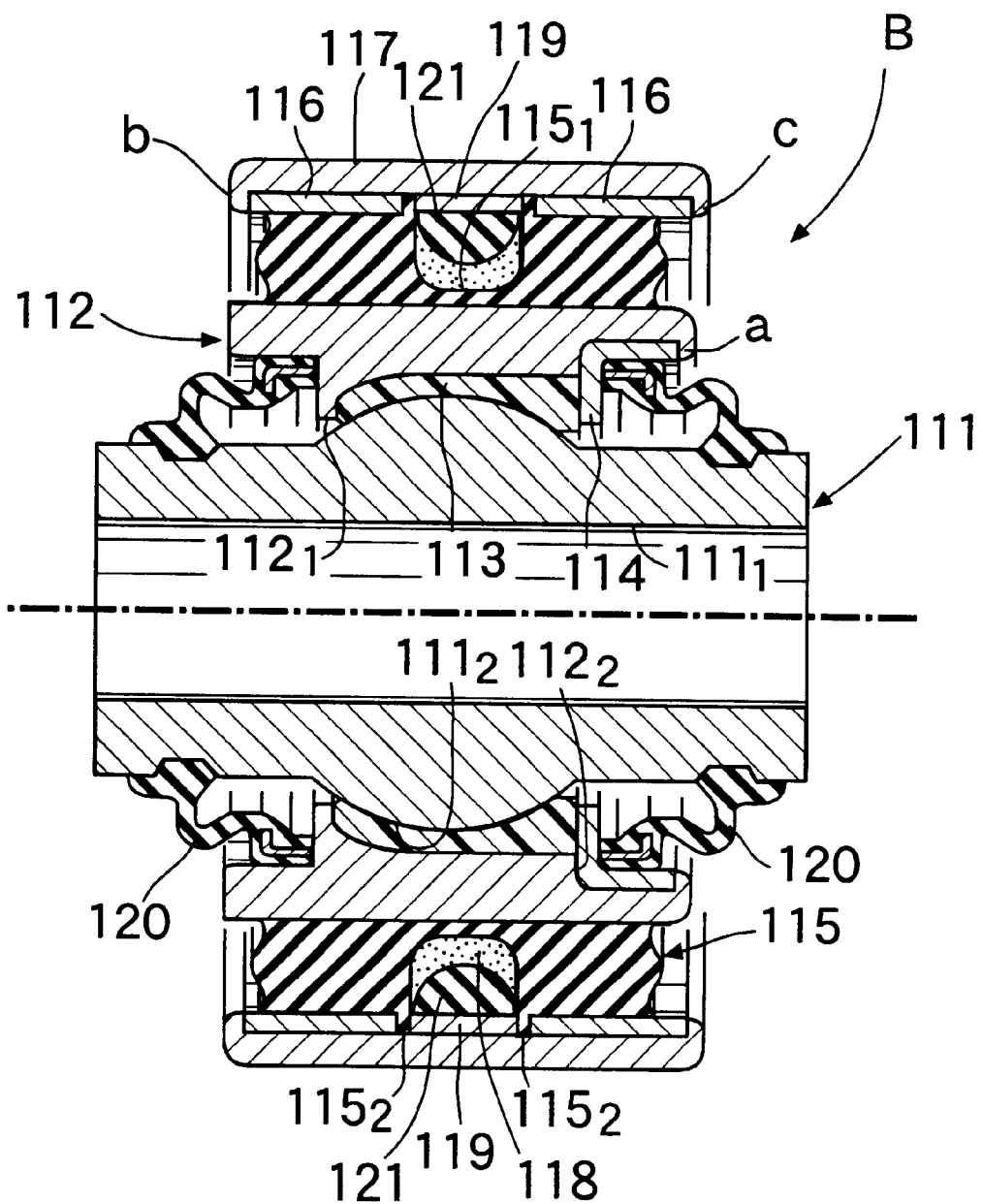
FIG. 25 is a vertical sectional view of a liquid encapsulated bushing according to an eighth embodiment.

FIG. 25 shows an eighth embodiment of the present invention. A liquid encapsulated bushing B in the eighth embodiment includes a plurality of stoppers 121 which are made of a rubber and which are mounted at circumferentially predetermined distances to inner surfaces of spacers 119 of the same liquid encapsulated bushing B as in the sixth embodiment. Thus, when a large load is applied to the outer tube 117, tip ends of the stoppers 121 are brought into contact with the bottom surface of the annular groove $115_1$. Therefore, the further relative displacement of the inner tube 112 and the outer tube 117 is inhibited, thus preventing excessive deformation of the bushing rubber 115 and providing an enhanced durability.

Figure 26:
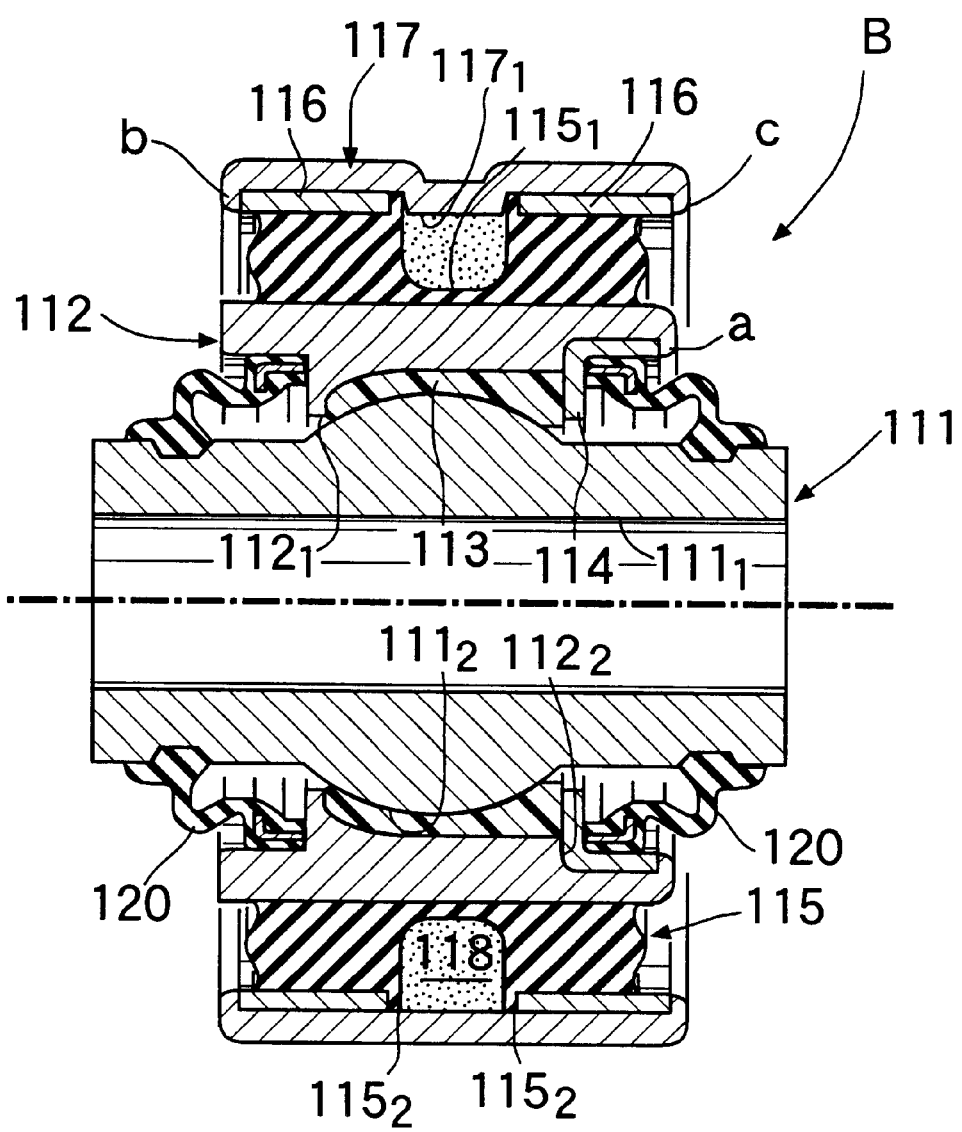
FIG. 26 is a vertical sectional view of a liquid encapsulated bushing according to a ninth embodiment.

FIG. 26 shows a ninth embodiment of the present invention. In a liquid encapsulated bushing B in the ninth embodiment, the spacers 119 and 119' used in the sixth and seventh embodiments are not used, and in place of these spacers, a plurality of projections $117_1$ are provided to protrude radially inwards from an outer tube 117. The projections $117_1$ are interposed between both of the rings 116 to extend in a liquid chamber 118. Therefore, the distance between the two rings 116 can be maintained constant by the projections $117_1$. With this embodiment, it is possible to reduce the number of parts in correspondence to the non-use of the spacers 119 or the spacer 119'.

Figure 27:
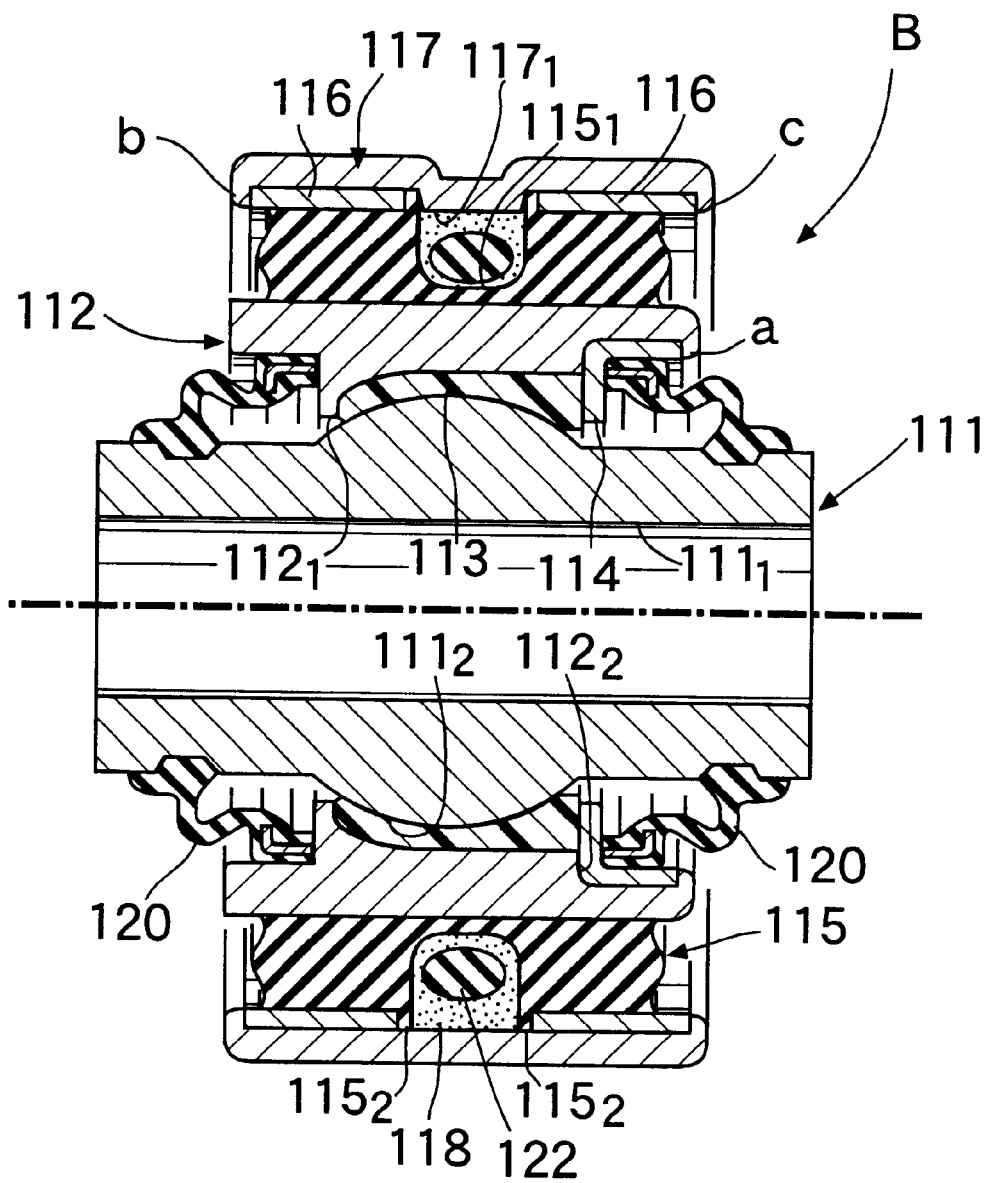
FIG. 27 is a vertical sectional view of a liquid encapsulated bushing according to a tenth embodiment.

FIG. 27 shows a tenth embodiment of the present invention. A liquid encapsulated bushing B in the tenth embodiment includes a stopper 122 which is made of a rubber and which is formed into an annular shape, in addition to the parts used in the liquid encapsulated bushing B in the ninth embodiment. The rubber stopper 122 can be stretched out. Hence, it can be mounted in the annular groove $115_1$ in the bushing rubber 115 before fixing of the outer tube 117. Thus, when a large load is applied to the outer tube 117, the stopper 122, which is mounted in a floated states in a liquid chamber 118, is brought into the bottom surface of the annular groove $115_1$ and the inner peripheral surface of the outer tube 117. Therefore, a large relative displacement of the inner tube $11_2$ and the outer tube 117 is inhibited to enhance the durability of the bushing rubber 115.

The annular stopper 122 can be mounted in the liquid chambers 118 according to the sixth and seventh embodiments. In this case, the stopper 122 contacts the bottom surface of the annular groove 115₁ and the inner peripheral surfaces of the spacers 119 and 119'.

Although, the clearance α has been defined between the outer tube 18 and the first collar 16 in the first embodiment, a clearance α may be defined between the inner tube 12 and the second collar 19, or clearances α may be defined both between the outer tube 18 and the first collar 16 and between the inner tube 12 and the second collar 19. In addition, although the preload has been applied to the second bushing rubber 17 in the fourth and fifth embodiments, the preload may be applied to the first bushing rubber 15 or to both of the first and second bushing rubbers 15 and 17. The respective features of the first to fifth embodiments may be combined with one another in any combination.

Although the two rings 116 have been fixed with the annular groove 115₁ in the bushing rubber 115 being interposed therebetween, both the rings 116 may be integrally connected to each other by a bridge. In short, when the two rings 116 are integrally formed, an opening facing the annular groove 115₁ may be defined in a portion of the ring, so that the liquid flows into the annular groove 115₁ when the bushing rubber 115 is submerged in the liquid tank T. If the two rings 116 are integrally formed in the above manner, the spacers 119 or the spacer 119' and the projections 117₁ are not required, leading to a further reduction in the number of parts. The material for the stoppers 121 or the stopper 122 is not limited to rubber and may be a styrene-olefin based thermoplastic elastomer, a polyvinyl chloride which is a soft resin, or the like.

Although the embodiments of the present invention have been described in detail, it will be understood that the present invention is not limited to the above-described embodiments, and various modifications in design may be made within the spirit and scope of the subject matter of the present invention defined in claims.

What is claimed is:

1. A liquid encapsulated bushing, comprising:

a support shaft extending along an axis and having a spherical portion extending radially from the support shaft relative to the axis and straddling a centrally disposed radial axis defining an axially first end side positioned on one side of the radial axis and an axially second end side positioned on an opposite side of the radial axis;

an inner tube supporting the spherical portion for rotation on an inner peripheral surface of the inner tube;

an outer tube disposed to cover an outside of the inner tube and to form a generally annular space between the inner and outer tubes, the annular space straddling the radial axis so as to extend into both the axially first end side and the axially second end side;

a first elastomeric member bonded to an outer peripheral surface of said inner tube and sized and adapted to occupy the annular space on the axially first end side, the first elastomeric member being coupled to the inner peripheral surface of the outer tube on the axially first end side;

a second elastomeric member bonded to an inner peripheral surface of the outer tube and sized and adapted to occupy the annular space on the axially second end side, and the second elastomeric member being coupled to the outer peripheral surface of the inner tube on the axially second end side; and a liquid chamber including a liquid encapsulated therein, the liquid chamber defined between the first and second elastomeric members and positioned generally adjacent the radial axis.

2. A liquid encapsulated bushing according to claim 1, wherein before integral assembling of said first and second elastomeric members, a preload in a compressing direction is applied to at least one of said first and second elastomeric members.

3. A liquid encapsulated bushing according to claim 1, wherein said first and second elastomeric members are in close contact with each other.

4. A liquid encapsulated bushing according to claim 1, wherein said first elastomeric member has an outer peripheral surface bonded to an inner peripheral surface of a first collar that is coupled to the inner peripheral surface of said outer tube and one of opposite axial ends of said outer tube is fixed to a corresponding one of axial opposite ends of said first collar by caulking.

5. A liquid encapsulated bushing according to claim 4, wherein said second elastomeric member has an inner peripheral surface bonded to an outer peripheral surface of a second collar that is coupled to the outer peripheral surface of said inner tube and one of opposite axial ends of said inner tube, which is located on an axial opposite end side with respect to said one end of said outer tube, is fixed to said second collar around a corresponding one of axial opposite ends of said second collar by caulking.

6. A liquid encapsulated bushing according to claim 5, wherein said inner tube has a step formed at an axially intermediate portion thereof and an end of said second elastomeric member exposed to said liquid chamber is clamped between the other axial end of said second collar and said step.

7. A liquid encapsulated bushing according to claim 6, wherein through assembly said first collar is pushed at its other axial end against an inner end of an outer periphery of said second elastomeric member.

8. A liquid encapsulated bushing according to claim 1, wherein a liquid injecting bore is formed through one of said first and second elastomeric members and means for occluding said liquid injecting bore is provided.

9. A liquid encapsulated bushing according to claim 8, wherein said liquid injecting bore is also formed through said inner tube.

* * * * *